(12) United States Patent
Jung et al.

(10) Patent No.: US 12,452,763 B2
(45) Date of Patent: Oct. 21, 2025

(54) ELECTRONIC DEVICE FOR PERFORMING NEIGHBOR AWARENESS NETWORKING COMMUNICATION AND METHOD OF OPERATING THE SAME

(71) Applicant: SAMSUNG ELECTRONICS CO., LTD., Suwon-si (KR)

(72) Inventors: Buseop Jung, Suwon-si (KR); Sunkee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 18/095,683

(22) Filed: Jan. 11, 2023

(65) Prior Publication Data

US 2023/0189118 A1 Jun. 15, 2023

Related U.S. Application Data

(63) Continuation of application No. PCT/KR2022/019667, filed on Dec. 6, 2022.

(30) Foreign Application Priority Data

Dec. 13, 2021 (KR) .................. 10-2021-0177660
Jan. 28, 2022 (KR) .................. 10-2022-0013727

(51) Int. Cl.
*H04W 24/00* (2009.01)
*H04W 8/00* (2009.01)
(Continued)

(52) U.S. Cl.
CPC .......... *H04W 40/22* (2013.01); *H04W 8/005* (2013.01); *H04W 60/04* (2013.01); *H04W 88/06* (2013.01); *H04W 88/182* (2013.01)

(58) Field of Classification Search
CPC ..... H04W 40/22; H04W 8/005; H04W 60/04; H04W 88/182
(Continued)

(56) References Cited

U.S. PATENT DOCUMENTS 9,143,979 B1 * 9/2015 Lambert ............... H04W 72/02
9,432,925 B2 * 8/2016 Kasslin ................. H04W 48/16
(Continued)

FOREIGN PATENT DOCUMENTS

JP          6655913          3/2020
KR   10-2018-0131965 A    12/2018
(Continued)

OTHER PUBLICATIONS

International Search Report dated Mar. 8, 2023 for PCT/KR2022/019667.
(Continued)

*Primary Examiner* — Marceau Milord
(74) *Attorney, Agent, or Firm* — Nixon & Vanderhye P.C.

(57) ABSTRACT

An electronic device may include a communication circuit; and a processor operatively connected to the communication circuit, wherein the processor may be configured to perform synchronization with neighbor awareness networking (NAN) based on NAN cluster information included in a signal broadcast by an external electronic device included in the NAN, to determine whether to switch to a second communication mode operable with lower power than that of the first communication mode based on a state of the electronic device while operating in the first communication mode capable of transmitting and/or receiving data each interval having a first value, to search for an external electronic device capable of performing a function of a proxy server among external electronic devices included in the NAN corresponding to determining to switch to the
(Continued)

second communication mode, to transmit a proxy registration request signal to the found external electronic device, and to operate in the second communication mode corresponding to completion of registration to the external electronic device, wherein the proxy registration request signal may include information related to a function to be performed by the external electronic device instead of the electronic device while operating in the second communication mode. In addition, various embodiments are possible.

20 Claims, 13 Drawing Sheets

(51) Int. Cl.
*H04W 40/22* (2009.01)
*H04W 60/04* (2009.01)
*H04W 88/06* (2009.01)
*H04W 88/18* (2009.01)

(58) Field of Classification Search
USPC .................................................... 455/456.1
See application file for complete search history.

(56) References Cited

U.S. PATENT DOCUMENTS

| | | | |
|---|---|---|---|
| 9,571,973 B1* | 2/2017 | Alanen | H04W 48/16 |
| 9,686,369 B2* | 6/2017 | Patil | H04L 67/51 |
| 9,693,217 B2* | 6/2017 | Kasslin | H04W 48/16 |
| 9,706,589 B2* | 7/2017 | Fodor | H04W 72/1215 |
| 10,075,837 B2 | 9/2018 | Aoki et al. | |
| 10,200,826 B2* | 2/2019 | Park | H04W 4/06 |
| 10,341,942 B2 | 7/2019 | Jung et al. | |
| 10,412,671 B2 | 9/2019 | Alanen et al. | |
| 10,433,353 B2* | 10/2019 | Yong | H04W 76/14 |
| 10,623,507 B2 | 4/2020 | Yoshikawa | |
| 10,736,022 B2* | 8/2020 | Liu | H04W 48/16 |
| 10,924,911 B2* | 2/2021 | Gurram | H04W 8/005 |
| 11,082,921 B2 | 8/2021 | Jung et al. | |
| 11,503,137 B2 | 11/2022 | Lee et al. | |
| 12,069,765 B2* | 8/2024 | Liu | H04W 4/80 |
| 2016/0165653 A1* | 6/2016 | Liu | H04W 72/12 370/329 |
| 2016/0226928 A1* | 8/2016 | Park | H04L 67/61 |
| 2016/0285630 A1* | 9/2016 | Abraham | H04L 65/611 |
| 2016/0286574 A1* | 9/2016 | Abraham | H04L 65/611 |
| 2016/0352269 A1* | 12/2016 | Takahashi | H02P 27/085 |
| 2016/0352842 A1* | 12/2016 | Patil | H04L 67/59 |
| 2016/0353269 A1* | 12/2016 | Kasslin | H04L 67/303 |
| 2017/0026995 A1* | 1/2017 | Huang | H04W 72/23 |
| 2017/0127344 A1* | 5/2017 | Liu | H04W 76/14 |
| 2017/0325230 A1 | 11/2017 | Abraham et al. | |
| 2018/0014341 A1* | 1/2018 | Jung | H04W 56/002 |
| 2018/0049013 A1 | 2/2018 | Lee et al. | |
| 2018/0092034 A1 | 3/2018 | Huang et al. | |
| 2018/0098211 A1* | 4/2018 | Park | H04W 8/06 |
| 2018/0183701 A1* | 6/2018 | Qi | H04W 40/32 |
| 2018/0352413 A1 | 12/2018 | Gurram et al. | |
| 2020/0145919 A1* | 5/2020 | Jung | H04W 84/20 |
| 2020/0404477 A1 | 12/2020 | Jung et al. | |
| 2021/0076314 A1* | 3/2021 | Wang | H04B 17/26 |
| 2021/0360524 A1 | 11/2021 | Jung et al. | |
| 2022/0197355 A1* | 6/2022 | Choi | G06F 1/206 |

FOREIGN PATENT DOCUMENTS

| | | |
|---|---|---|
| KR | 10-2019-0002512 A | 1/2019 |
| KR | 10-2020-0052673 | 5/2020 |
| KR | 10-2020-0079083 | 7/2020 |
| KR | 10-2208438 B1 | 1/2021 |
| WO | WO 2016/148523 A1 | 9/2016 |
| WO | WO 2016/171527 A1 | 10/2016 |
| WO | WO 2023/113351 A1 | 6/2023 |

OTHER PUBLICATIONS

Notification of Publication dated Jun. 22, 2023 for PCT/KR2022/019667.

Extended European Search Report dated Jan. 8, 2025 for EP Application No. 22907820.9.

* cited by examiner ial Application No. PCT/KR2022/019667, filed Dec. 6, 2022, designating the United States, in the Korean Intellectual Property Receiving Office, and claiming priority to each of KR Patent Application Nos. 10-2021-0177660 filed Dec. 13, 2021, and 10-2022-0013727 filed Jan. 28, 2022, the disclosures of which are all hereby incorporated by reference herein in their entireties.

ELECTRONIC DEVICE FOR PERFORMING NEIGHBOR AWARENESS NETWORKING COMMUNICATION AND METHOD OF OPERATING THE SAME

CROSS-REFERENCE TO RELATED APPLICATIONS

This application is a continuation of International Application No. PCT/KR2022/019667, filed Dec. 6, 2022, designating the United States, in the Korean Intellectual Property Receiving Office, and claiming priority to each of KR Patent Application Nos. 10-2021-0177660 filed Dec. 13, 2021, and 10-2022-0013727 filed Jan. 28, 2022, the disclosures of which are all hereby incorporated by reference herein in their entireties.

BACKGROUND

Field

Various example embodiments relate to an electronic device and/or a method of operating the electronic device, and for example, to an electronic device for performing neighbor awareness networking (NAN) communication.

Description of Related Art

With the spread of various electronic devices, speed improvement for wireless communication that may be used by various electronic devices has been implemented.

Further, recently, various types of proximity services using low power discovery technology have been developed. For example, a proximity service (or proximity communication service) in which adjacent electronic devices can quickly exchange data through a proximity network is being developed. The proximity service may include a low power proximity service using a Bluetooth low energy (BLE) beacon, low power short range communication technology (e.g., neighbor awareness networking (NAN)) based on a wireless local area network (WLAN), and a low power proximity service based on Wi-Fi aware (hereinafter, referred to as 'NAN').

SUMMARY

A NAN-based low power proximity service (hereinafter, referred to as a 'proximity service') refers to a service that constitutes and uses a proximity network that dynamically changes according to the movement of an electronic device, and a set of electronic devices constituting a proximity network may be referred to as a cluster. In the case of the proximity service, electronic devices included in the cluster may transmit and receive a signal (e.g., beacon) for discovery and a service discovery frame (hereinafter, referred to as 'SDF') within time duration (or communication duration) in which the electronic devices are synchronized with each other. For example, at least one electronic device in the cluster may transmit a signal notifying existence of the cluster, and a new electronic device to participate in the cluster may receive the signal.

In order to reduce current consumption (or power consumption), each electronic device in the cluster may differently configure active durations that may transmit and receive signals. In NAN communication, active duration that may transmit and receive a signal may be referred to as a discovery window (DW). Further, electronic devices included in the cluster may reduce current consumption by maintaining a low power state (e.g., sleep state) in duration other than the synchronized time duration. Further, nowadays, a research on methods for reducing current consumption in NAN is in progress.

Electronic devices may transmit or receive data within a discovery window. The discovery window may be duration in which electronic devices included in the NAN cluster are activated, and the electronic device may perform data transmission and/or reception by a contention-based method (e.g., CSMA/CA). In the case that the electronic device fails to transmit and/or receive data within the discovery window, the electronic device transmits and/or receives data during an additional period between the discovery windows; thus, a problem that power consumption of the electronic device increases may occur.

An electronic device operating as a proxy client may enable an external electronic device operating as a proxy server to perform a service discovery operation, and may perform directly other functions (e.g., post initiation communication, NDP, or ranging). As the electronic device directly performs other functions, a problem that power consumption of the electronic device further increases may occur.

According to various example embodiments, an electronic device may include a communication circuit; and a processor operatively connected, directly or indirectly, to the communication circuit, wherein the processor may be configured to perform synchronization with neighbor awareness networking (NAN) based on NAN cluster information included in a signal broadcast by an external electronic device included in the NAN, to determine whether to switch to a second communication mode operable with lower power than that of a first communication mode based on a state of the electronic device while operating in the first communication mode capable of transmitting and/or receiving data each interval having a first value, to search for an external electronic device capable of performing a function of a proxy server among external electronic devices included in the NAN corresponding to determining to switch to the second communication mode, to transmit a proxy registration request signal to the found external electronic device, and to operate in the second communication mode corresponding to completion of registration to the external electronic device, wherein the proxy registration request signal may include information related to a function to be performed by the external electronic device instead of the electronic device while operating in the second communication mode.

According to various example embodiments, a method of operating an electronic device may include performing synchronization with neighbor awareness networking (NAN) based on NAN cluster information included in a signal broadcast by an external electronic device included in the NAN; determining whether to switch to a second communication mode operable with lower power than that of a first communication mode based on a state of the electronic device while operating in the first communication mode capable of transmitting and/or receiving data each interval having a first value; searching for an external electronic device capable of performing a function of a proxy server among external electronic devices included in the NAN corresponding to determining to switch to the second communication mode; transmitting a proxy registration request signal to the found external electronic device; and operating in the second communication mode corresponding to completion of registration to the external electronic device, wherein the proxy registration request signal may include information related to a function to be performed by the external electronic device instead of the electronic device while operating in the second communication mode.

According to various example embodiments, an electronic device may include a communication circuit; and a processor operatively connected, directly or indirectly, to the communication circuit, wherein the processor may be configured to perform synchronization with neighbor awareness networking (NAN) based on NAN cluster information included in a signal broadcast by an external electronic device included in the NAN, to register an external electronic device as a proxy client based on a signal transmitted by the external electronic device that intends to operate as the proxy client among external electronic devices included in the NAN while operating as a proxy server in the NAN cluster, and to transmit information of the external electronic device to the other external electronic device according to searching for another external electronic device operating as a proxy server.

In an electronic device and a method of operating the electronic device according to various example embodiments, in the case that an electronic device operating as a proxy client satisfies a specified condition, by enabling to operate some of functions performed by the electronic device in a communication mode performed by an external electronic device operating as a proxy server, power consumption of the electronic device can be reduced.

In an electronic device and/or a method of operating the electronic device according to various example embodiments, an electronic device operating as a proxy server can transmit information of an external electronic device operating as a proxy client to another external electronic device operating as a proxy server. Accordingly, even if the external electronic device operating as a proxy client is connected to another external electronic device, by enabling the external electronic device to operate as a proxy server without a separate registration procedure, power consumption of the external electronic device caused by an additional registration procedure can be reduced.

BRIEF DESCRIPTION OF DRAWINGS

This method and the device illustrated in the accompanying drawings, throughout which reference letters indicate corresponding parts in the various figures. Certain example embodiments herein will be better understood from the following description with reference to the drawings, in which.

DETAILED DESCRIPTION

Figure 1:
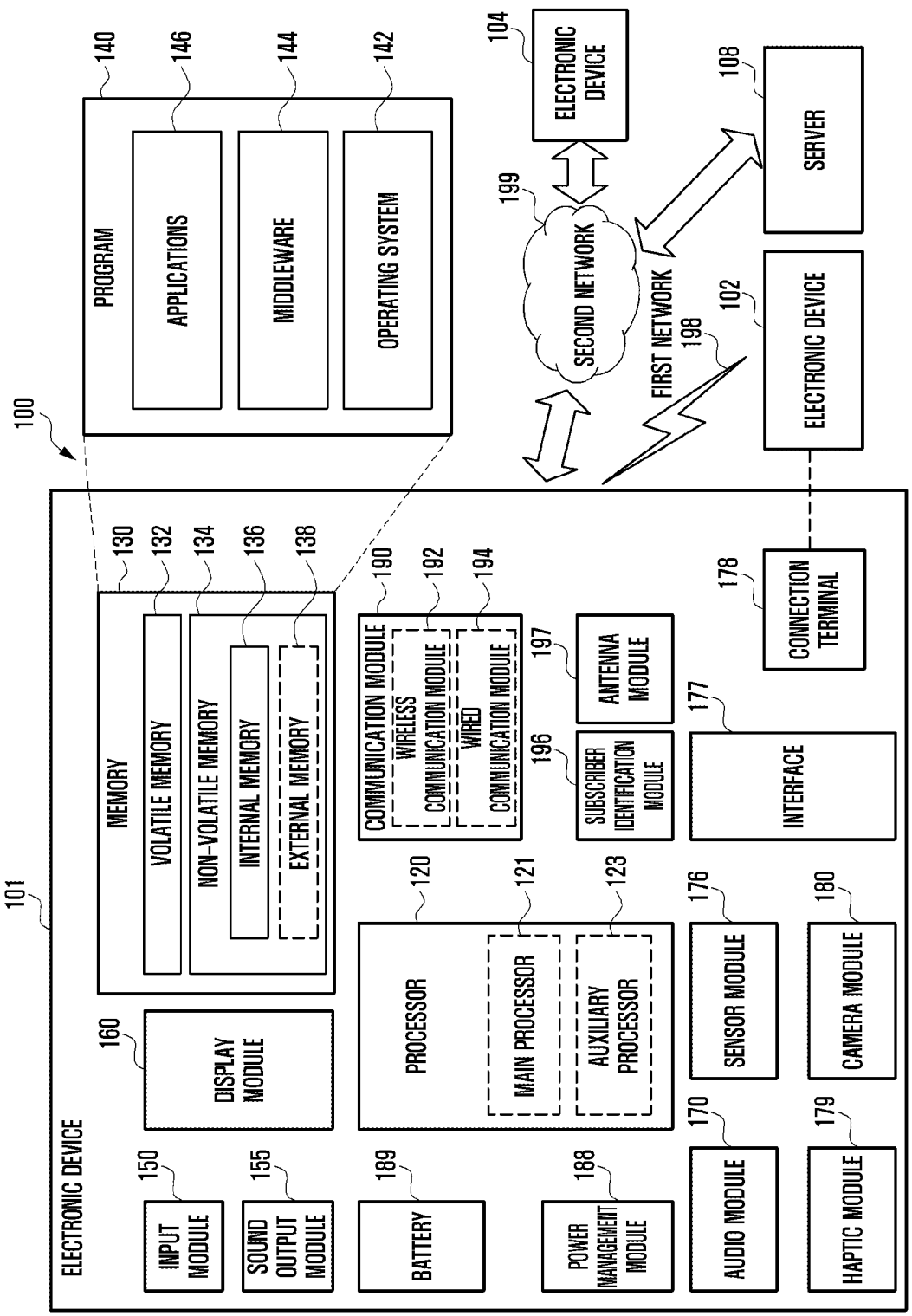
FIG. 1 is a block diagram illustrating an electronic device according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited, to, e.g., supervised learning, unsupervised learning, semi-supervised learning, or reinforcement learning. The artificial intelligence model may include a plurality of artificial neural network layers. The artificial neural network may be a deep neural network (DIN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hard ware structure.

The memory 130 may store various data used by at least one component (e.g., the processor 1120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 1130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 56 network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
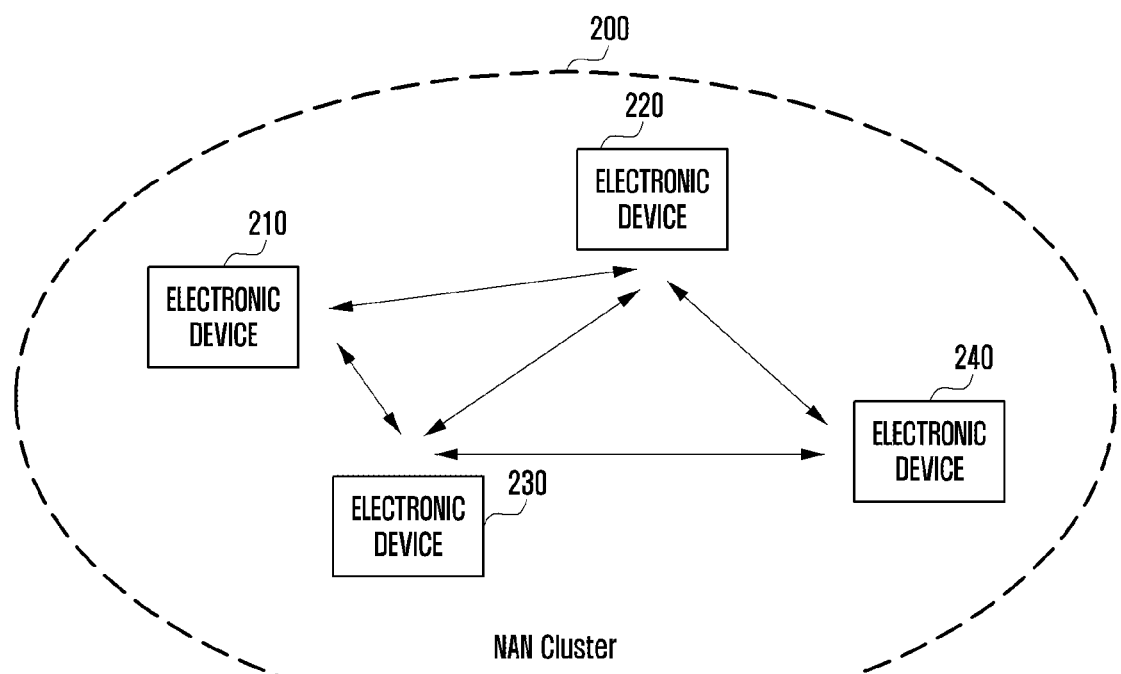
FIG. 2 is a diagram illustrating a neighbor awareness network (NAN) cluster according to various example embodiments.

FIG. 2 is a diagram illustrating a neighbor awareness network (NAN) cluster according to various example embodiments.

For example, FIG. 2 illustrates a constitution example of a NAN cluster 200 for a proximity network according to various embodiments. In the following description, the cluster 200 may indicate a set of electronic devices 210, 220, 230, or 240 constituting a proximity network so that each of the electronic devices (or NAN devices) (e.g., the electronic device 101 of FIG. 1) 210, 220, 230, or 240 transmits and receives data to and from each other. For example, the cluster 200 may be referred to as a NAN cluster according to a NAN specification (or standard).

With reference to FIG. 2, the cluster 200 may include a plurality of electronic devices 210, 220, 230, or 240. The electronic devices 210, 220, 230, or 240 included in the cluster 200 may transmit and receive a beacon (or discovery beacon) and/or a service discovery frame (hereinafter, referred to as an 'SDF') within synchronized time duration (or communication duration) discovery (or search) window (discovery window (DW)).

The electronic devices 210, 220, 230, or 240 in the cluster 200 may synchronize time clocks with each other. For example, the electronic devices 210, 220, 230, or 240 may be synchronized with a time clock of one electronic device (e.g., the electronic device 210), and give and receive beacons and SDFs to and from each other in the same discovery window.

According to an embodiment, the electronic device supporting NAN-based low power short range communication technology may broadcast a discovery signal (e.g., beacon) for discovering another electronic device every preconfigured first cycle (e.g., about 100 msec) and perform scanning every second preconfigured cycle (e.g., about 10 msec) to receive a discovery signal broadcast from another electronic device.

The electronic devices 210, 220, 230, or 240 may detect at least one other electronic device positioned in the vicinity of the electronic device based on the discovery signal received through scanning, and synchronize an NAN cluster with the detected at least one other electronic device. NAN cluster synchronization may include an operation of receiving time clock information of an electronic device representing the NAN cluster so that the electronic devices included in the NAN cluster transmit and/or receive data on the same channel and/or during the same time.

For example, as illustrated in FIG. 2, as each of the plurality of electronic devices 210, 220, 230, or 240 transmits a beacon and receives a beacon from the other electronic devices 210, 220, 230, or 240, each of the plurality of electronic devices 210, 220, 230, or 240 may form one cluster 200 that operates according to the synchronized time clock, and the electronic devices 210, 220, 230, or 240 in the cluster 200 may perform NAN cluster synchronization.

The NAN cluster synchronization may be performed based on a time and channel of the electronic device having the highest master preference in the cluster 200. For example, the electronic devices 210, 220, 230, or 240 in the cluster 200 formed through discovery may exchange a signal on master preference information indicating a preference that operates as an anchor master, and an electronic device having the highest master preference may be determined as an anchor master (or master electronic device) through the exchanged signal.

The anchor master may indicate an electronic device that serves as a reference for time and channel synchronization of the electronic devices 210, 220, 210, or 240 in the cluster 200. The anchor master may be changed according to the master preference of the electronic device. Each of the electronic devices 210, 220, 230, or 240 synchronized in time and channel may transmit a beacon and an SDF within a discovery window (or search interval) repeated according to a preconfigured cycle, and receive a beacon and an SDF from another electronic device in the cluster 200. According to an embodiment, in order to continuously maintain time and channel synchronization of the electronic devices 210, 220, 230, or 240 in the cluster 200, the beacon may be periodically transmitted and received every discovery window. In order to provide a service with the found electronic devices 210, 220, 230, or 240, the SDF may be transmitted and received in the discovery window, as needed. According to an embodiment, an electronic device operating as an anchor master among the electronic devices 210, 220, 230, or 240 synchronized in time and channel may transmit a beacon so as to detect a new electronic device in an interval between discovery windows.

Each of the electronic devices 210, 220, 230, or 240 in the cluster 200 may operate in an active state (e.g., only) during the discovery window and operate in a low power state (e.g., sleep state) during the remaining interval other than the discovery window, thereby reducing current consumption.

For example, the discovery window is a time (e.g., milliseconds) during which the electronic device is in active state (or a wake state) and consumes a lot of current, whereas in an interval other than the discovery window, the electronic device maintains a sleep state; thus, low power discovery may be possible.

The electronic devices 210, 220, 230, or 240 in the cluster 200 may be simultaneously activated at a start time point (e.g., DW start) of the synchronized discovery window and be simultaneously switched to a sleep state at an end time point (e.g., DW end) of the discovery window.

The electronic devices 210, 220, 230, or 240 included in the cluster 200 may perform discovery, synchronization, and data exchange operations using a protocol illustrated in FIG. 3 to be described later.

Figure 3:
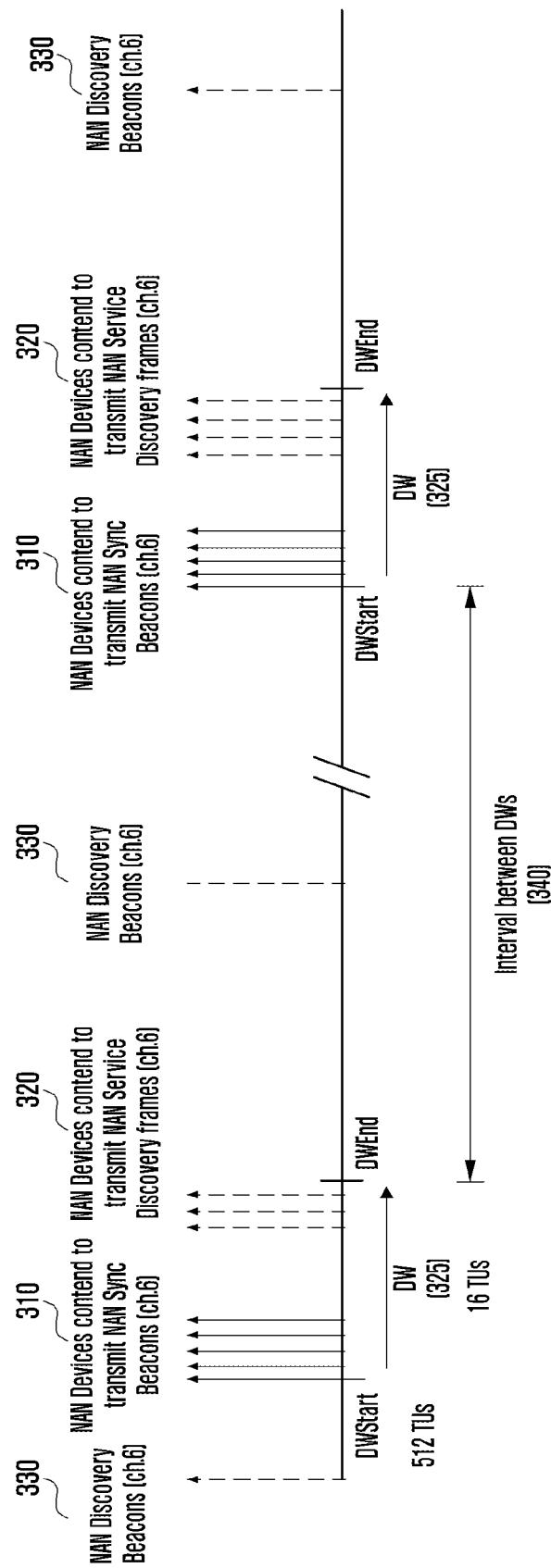
FIG. 3 is a diagram illustrating a protocol for transmitting a signal of an electronic device included in a NAN cluster according to various example embodiments.

FIG. 3 is a diagram illustrating a protocol for transmitting a signal of an electronic device included in a NAN cluster according to various example embodiments.

For example, FIG. 3 is a diagram illustrating a discovery window according to various embodiments. FIG. 3 illustrates an example in which electronic devices included in one cluster transmit signals through a specific channel (e.g., Ch6) based on the NAN specification.

With reference to FIG. 3, electronic devices included in one cluster may transmit a synchronization beacon 310 and an SDF 320 in a synchronized discovery window (DW) 325. A discovery beacon 330 may be transmitted by at least one electronic device in an interval 340 other than the DW 325 (e.g., an interval between DWs). According to an embodiment, the electronic devices may transmit the synchronization beacon 310 and the SDF 320 based on contention. For example, the synchronization beacon 310 and the SDF 320 may be transmitted based on contention between electronic devices belonging to the cluster.

The DW 325 may be an interval in which a corresponding electronic device is activated from a sleep state, which is a power saving mode to a wake-up state for data exchange between respective electronic devices. For example, the DW 325 may be divided into time units (TUs) of milliseconds. According to an embodiment, the DW 325 for transmitting and receiving the synchronization beacon 310 and the SDF 320 may occupy 16 time units (TUs), and have a cycle (or interval) repeated in 512 TUs.

The discovery beacon 330 may represent a signal transmitted to enable another electronic device that has not joined the cluster to discover the cluster. For example, the discovery beacon 330 is a signal notifying existence of a cluster, and electronic devices that have not joined the cluster may perform a passive scan to receive the discovery beacon 330, thereby discovering and joining the cluster.

The discovery beacon 330 may include information necessary for synchronization with the cluster. For example, the discovery beacon 330 may include at least one of a frame control (FC) field indicating a signal function (e.g., beacon), a broadcast address, a media access control (MAC) address of a transmitting electronic device, a cluster identifier (ID), a sequence control field, a time stamp for a beacon frame, a beacon interval indicating a transmission interval of the discovery beacon 330, or capability information on the electronic device that transmits the discovery beacon 330.

The discovery beacon 330 may include at least one proximity network (or cluster) related information element. In an embodiment, the proximity network related information may be referred to as attribute information.

The synchronization beacon 310 may represent a signal for maintaining synchronization between synchronized electronic devices in the cluster. The synchronization beacon 310 may be transmitted by a synchronization device among electronic devices in the cluster. For example, the synchronization device may include an anchor master device in the NAN specification, a master device, or a non-master sync device.

The synchronization beacon 310 may include information necessary for synchronization of electronic devices within the cluster. For example, the synchronization beacon 310 may include at least one of an FC field indicating a signal function (e.g., beacon), a broadcast address, a MAC address of a transmitting electronic device, a cluster identifier, a sequence control field, a time stamp for a beacon frame, a beacon interval indicating an interval between starting points of the DW 325, or capability information on a transmitting electronic device. According to an embodiment, the synchronization beacon 310 may include at least one proximity network (or cluster) related information element. For example, the proximity network related information may include contents for a service provided through the proximity network.

The SDF 320 may represent a signal for exchanging data through a proximity network. According to an embodiment, the SDF 320 represents a vendor specific public action frame and may include various fields. For example, the SDF 320 may include a category or an action field, and include at least one proximity network related information.

The synchronization beacon 310, the SDF 320, and the discovery beacon 330 may include proximity network related information. In an embodiment, the proximity network related information may include an identifier indicating a type of information, a length of the information, and a body field, which is corresponding information. According to an embodiment, the corresponding information may include at least one of master indication information, cluster information, service identifier list information, service descriptor information, connection capability information, wireless LAN infrastructure information, peer to peer (P2P) operation information, independent basic service set (IBSS) information, mesh information, additional proximity network service discovery information, further availability map information, country code information, ranging information, cluster discovery information, or vendor specific information.

Figure 4:
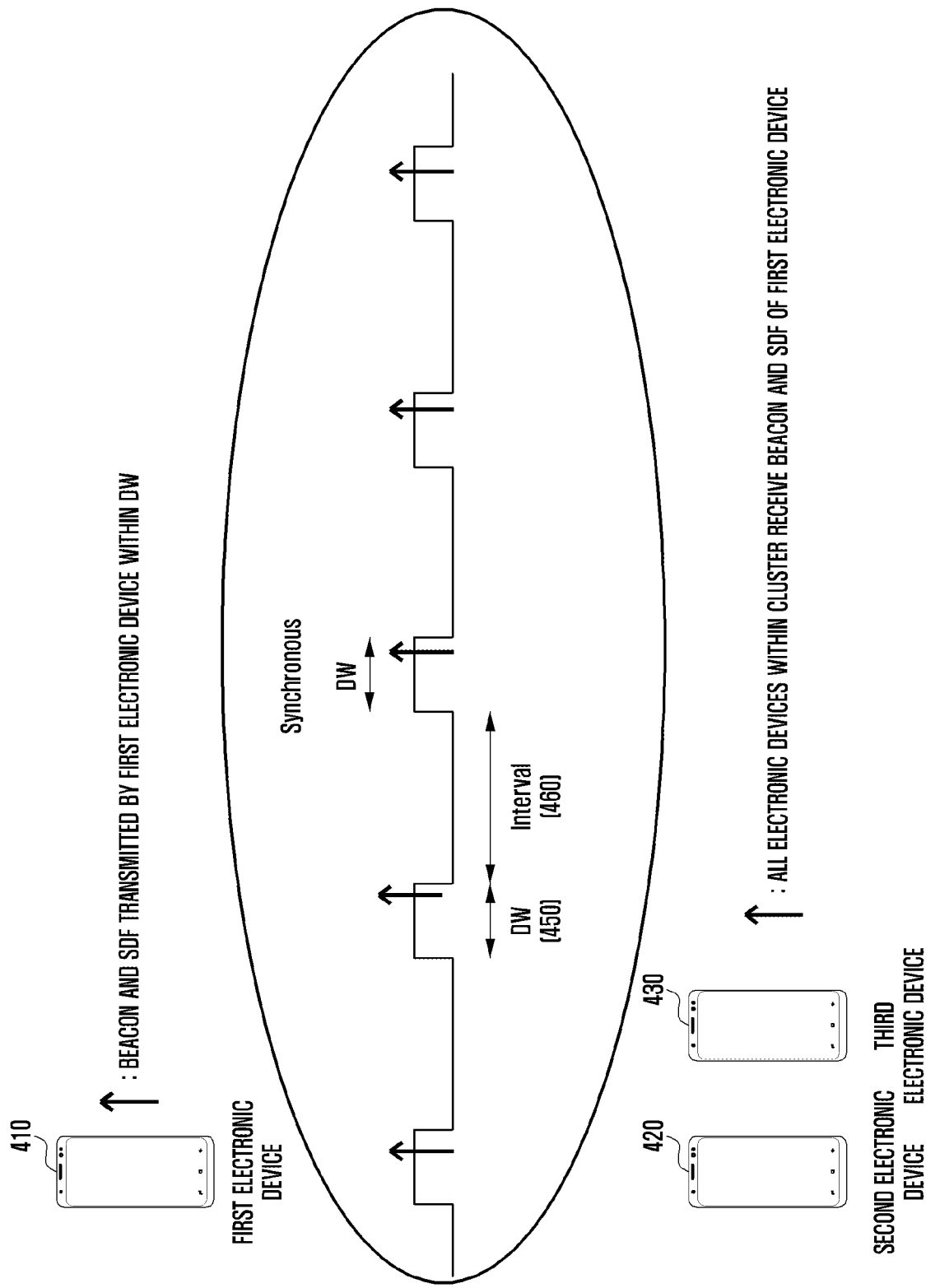
FIG. 4 is a diagram illustrating an example of data transmission and reception in a NAN cluster according to various example embodiments.

FIG. 4 is a diagram illustrating an example of data transmission and reception in a NAN cluster according to various example embodiments.

For example, FIG. 4 illustrates an example in which a first electronic device 410, a second electronic device 420, and a third electronic device 430 form one cluster through wireless short range communication technology, and each of the electronic devices 410, 420, and 430 may transmit and receive a beacon and/or an SDF to and from each other. According to an embodiment, FIG. 4 may exemplify that the first electronic device 410 of the electronic devices 410, 420, or 430 constituting the cluster serves as a master electronic device.

With reference to FIG. 4, the first electronic device 410 may transmit a beacon and an SDF within the DW 450. The first electronic device 410 may broadcast a beacon and an SDF for each DW 450 repeated each preconfigured interval (e.g., an interval 460).

The second electronic device 420 and the third electronic device 430 may receive the beacon and the SDF transmitted by the first electronic device 410, According to an embodiment, each of the second electronic device 420 and the third electronic device 430 may receive a beacon and an SDF broadcast from the first electronic device 410 for each DW 450.

The beacon transmitted within the DW 450 may include a synchronization beacon and include information for maintaining synchronization between the electronic devices 410, 420, or 430. For example, the second electronic device 420 and/or the third electronic device 430 may perform NAN cluster synchronization based on time clock information of the first electronic device 410 included in a beacon transmitted by the first electronic device 410 operating as a master. The second electronic device 420 and/or the third electronic device 430 may be synchronized, and the DW 450 may be activated at the same time.

In an interval (e.g., the interval 460) other than the DW 450, the electronic devices 410, 420, or 430 may maintain a sleep state so as to reduce current consumption. For example, the electronic devices 410, 420, or 430 may operate in a wake state (e.g., only) in an interval of the DW 450 based on the synchronized time dock to reduce current consumption.

Figure 5:
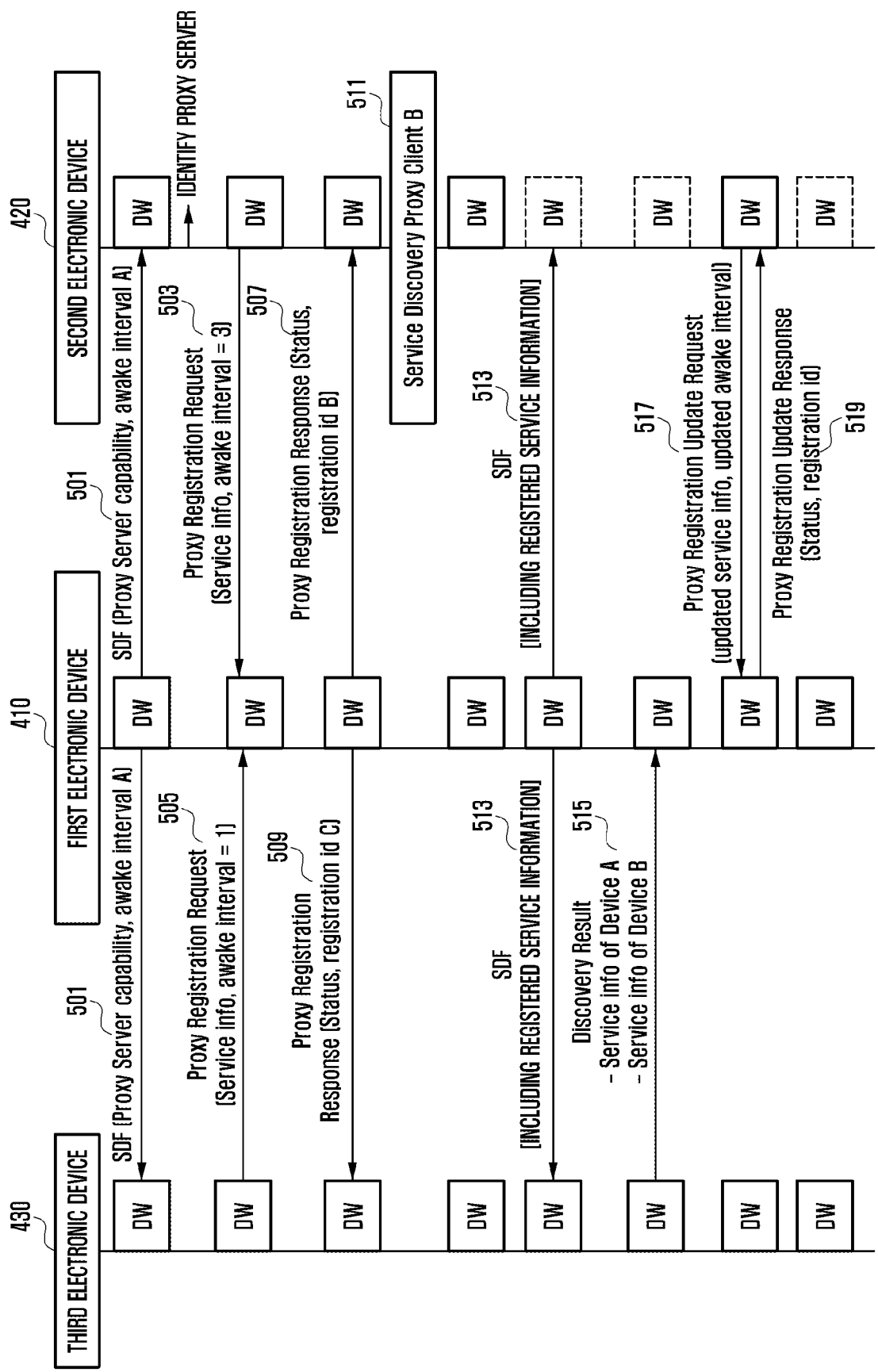
FIG. 5 is a diagram illustrating a proxy server and a proxy client in a NAN cluster according to various example embodiments.

FIG. 5 is a diagram illustrating a proxy server and a proxy client in a NAN cluster according to various example embodiments.

The NAN cluster may support various technologies that can reduce current consumption of electronic devices (e.g., the first electronic device 410, the second electronic device 420, and/or the third electronic device 430 of FIG. 4) included therein. For example, the NAN cluster may support a NAN service discovery proxy (hereinafter, referred to as a 'service discovery proxy') function of reducing current consumption by controlling load balancing of traffic.

One electronic device of electronic devices included in the NAN cluster supporting the service discovery proxy may operate as a NAN proxy server (hereinafter, referred to as a 'proxy server'), and the other electronic device may operate (or perform a function) as a NAN proxy client (hereinafter, referred to as a 'proxy client').

Electronic devices in the cluster may be synchronized with the same DW, perform a proxy server negotiation between the electronic devices, and determine whether to operate as a proxy server or a proxy client between the electronic devices based on the proxy server negotiation. The electronic device designated as the proxy server may instead perform a procedure for data communication (e.g., service discovery operation) for the proxy client, thereby reducing current consumption of the proxy client. Hereinafter, for convenience of description, it is assumed that the first electronic device 410 operates as a proxy server and that the second electronic device 420 and/or the third electronic device 430 operates as a proxy client.

In operation 501, the first electronic device 410 may broadcast an SDF including information indicating whether to support a proxy server function during a DW interval.

The information indicating whether the proxy server function is supported may include proxy server capability information and/or awake interval information (e.g., DW awake interval)).

The second electronic device 420 may identify information indicating whether the second electronic device 420 supports the proxy server function included in the SDF broadcasted by the first electronic device 410 and identify whether the first electronic device 410 operates as the proxy server.

The third electronic device 430 may identify information indicating whether the third electronic device 430 supports the proxy server function included in the SDF broadcasted by the first electronic device 410 and identify whether the first electronic device 410 operates as the proxy server.

In operation 503, the second electronic device 420 may transmit a request message for requesting proxy client registration (e.g., proxy registration request message) to the first electronic device 410 performing a proxy server function.

The proxy registration request message may include awake interval information (e.g., awake interval B=3) and service information to be obtained by the second electronic device 420. According to an embodiment, in order to reduce current consumption when operating as a proxy client, the second electronic device 420 may transmit a proxy registration request message including an increased awake interval to the first electronic device 410.

When operating as a proxy client, the second electronic device 420 may increase (or reconfigure) (e.g., awake interval B=3) the currently configured awake interval (e.g., awake interval B=1), thereby reducing current consumption while operating as a proxy client.

In operation 505, the third electronic device 430 may transmit a message for requesting registration (e.g., proxy registration request message) as a proxy client to the first electronic device 410 performing a proxy server function.

The proxy registration request message may include awake interval information (e.g., awake interval B=1) and service information to be obtained by the third electronic device 430. Although FIG. 5 illustrates that the third electronic device 430 is activated for every DW, the third electronic device 430 may be activated every other interval (e.g., awake interval B=2). According to an embodiment, in order to reduce current consumption when operating as a proxy client, the third electronic device 430 may transmit a proxy registration request message including an increased awake interval to the first electronic device 410. The third electronic device 430 may not operate as a proxy client. The third electronic device 430 that does not operate as a proxy client may transmit data (e.g., a discovery result in operation 515) to the first electronic device 410 in an interval in which a transmission and/or reception function of the first electronic device 410 is activated based on an awake interval included in the SDF broadcast by the first electronic device 410.

In operation 507, the first electronic device 410 may transmit a response message (e.g., proxy registration response message) on whether proxy registration of the second electronic device 420 to the second electronic device 420 in response to the proxy registration request of the second electronic device 420. According to an embodiment, the response message may include information (e.g., status) on acceptance or rejection for the proxy registration request of the second electronic device 420. According to an embodiment, in the case that the first electronic device 410 accepts the proxy registration request of the second electronic device 420, the response message may include registration information (e.g., registration ID information (e.g., registration ID B)) allocated to the second electronic device 420.

In operation 509, the first electronic device 410 may transmit a response message (e.g., proxy registration response) on whether proxy registration of the third electronic device 430 to the third electronic device 430 in response to the proxy registration request of the third electronic device 430. According to an embodiment, the response message may include information (e.g., status) acceptance or rejection for the proxy registration request of the third electronic device 430. According to an embodiment, in the case that the first electronic device 410 accepts the proxy registration request of the third electronic device 430, the response message may include registration information (e.g., registration ID information (e.g., registration ID C)) allocated to the third electronic device 430.

The second electronic device 420 may operate as a proxy client in operation 511. The second electronic device 420 may transmit and/or receive data every four DWs based on an awake interval (e.g., awake interval=4) requested thereby.

In operation 513, the first electronic device 410 may be activated for every DW (e.g., awake interval A=1) to perform service discovery.

The first electronic device 410 may broadcast a service discovery frame (SDF) including service information (or service information registered in the first electronic device 410) included in the proxy registration request message transmitted by the second electronic device 420.

In operation 513, the second electronic device 420 may exist in a deactivated state and may not receive the SDF broadcast by the first electronic device 410.

The third electronic device 430 may receive the SDF broadcast by the first electronic device 410 in operation 509 and identify service information included in the SDF. In operation 515, the third electronic device 430 may transmit information related to service information (or information that the second electronic device 420 intends to acquire) to the first electronic device 410.

The first electronic device 410 may broadcast a service discovery frame including information transmitted by the third electronic device 430 in the DW in which the second electronic device 420 is activated. The second electronic device 420 may receive and/or acquire information transmitted by the third electronic device 430 included in the service discovery frame. Through the above method, the second electronic device 420 may acquire service information provided by the third electronic device 430 through the first electronic device 410 even in a state in which only a partial DW is activated.

In operation 517, the second electronic device 420 may transmit a proxy registration update request message to the first electronic device 410 so as to acquire information related to another service or to change the awake interval.

The proxy registration update request message may include updated service information to be obtained by the second electronic device 420 and updated awake interval information (e.g., awake interval B=3).

In operation 519, in response to the proxy registration update request message, the first electronic device 410 may transmit a response message (e.g., proxy registration update response message) on whether to update the proxy registration of the second electronic device 420 to the second electronic device 420. According to an embodiment, the response message may include information (e.g., status) on acceptance or rejection for the proxy registration request of the second electronic device 420. According to an embodiment, in the case that the first electronic device 410 accepts the proxy registration update request of the second electronic device 420, the response message may include registration information (e.g., registration ID information (e.g., existing registration ID B) or new registration ID information (registration ID C)) allocated to the second electronic device 420.

With reference to the above-described embodiment, as defined in the NAN standard, the first electronic device 410 operating as a proxy server instead of the second electronic device 420 may perform a service discovery function among functions in which the second electronic device 420 operating as a proxy client may perform. Hereinafter, embodiments in which power consumption of the second electronic device 420 may be further reduced by enabling the first electronic device 410 to perform instead other functions performed by the second electronic device 420 will be described later.

Figure 6:
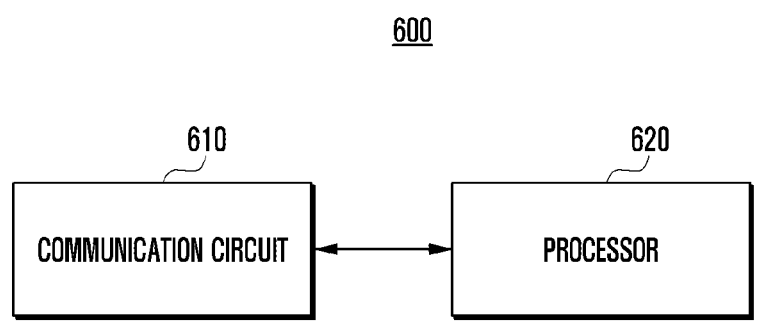
FIG. 6 is a block diagram illustrating an electronic device according to various example embodiments.

FIG. 6 is a block diagram illustrating an electronic device according to various example embodiments.

According to various example embodiments, an electronic device 600 (e.g., the second electronic device 420 of FIG. 4) may include a communication circuit 610 (e.g., the wireless communication module 192 of FIG. 1) and a processor 620 (e.g., the processor 120 of FIG. 1).

The communication circuit 610 may include various circuit structures used for modulation and/or demodulation of a signal in the electronic device 600. For example, the communication circuit 610 may modulate a signal of a baseband to a signal of a radio frequency (RF) band so as to output the signal of the baseband through an antenna (not illustrated) or may demodulate a signal of an RF band received through the antenna to a signal of a base, band to transmit the signal to the processor 620.

The communication circuit 610 may transmit or receive various data to or from an external electronic device (e.g., the first electronic device 410 of FIG. 4) through a frequency bared (e.g., 2.4 GHz, 5 GHz, and/or 6 GHz) used by electronic devices of the NAN cluster (e.g., the NAN cluster 200 of FIG. 2).

The processor 620 may perform an operation of generating a packet for receiving data transmitted by an application processor (e.g., the processor 120 of FIG. 1) and transmitting the received data to an external electronic device (e.g., the first electronic device 410 of FIG. 5). The external electronic device may indicate the first electronic device 410 of FIG. 5. The processor 620, comprising processing circuitry, may be a communication processor (or communication processor) included in a communication module (e.g., the wireless communication module 192 of FIG. 1, comprising communication circuitry). According to an embodiment, the processor 620 may generate a packet by performing channel coding based on data transmitted by the application processor (e.g., the application processor 120 of FIG. 1), identify whether there is an error in at least a part of data transmitted by the external electronic device 410, or perform an error recovery operation (e.g., hybrid auto repeat request (HARQ)) in the case that an error occurs.

The processor 620 may perform synchronization with the NAN cluster based on NAN cluster information included in a signal broadcast by the external electronic device 410 included in the cluster (or network) (e.g., the NAN cluster 200 of FIG. 2) implemented in a NAN method. Alternatively, the processor 620 may receive NAN cluster information through a communication method (e.g., short range wireless communication including Wi-Fi or Bluetooth) other than an NAN-based method. For example, the processor 620 may transmit a probe request signal for finding the external electronic device 410 to be connected through Wi-Fi and perform NAN cluster synchronization based on NAN cluster information included in a probe response message transmitted by the external electronic device 410 corresponding to the probe request signal. NAN cluster synchronization may include an operation of receiving time clock information of the electronic device (e.g., the external electronic device 410) representing the NAN cluster so that the electronic devices included in the NAN cluster transmit and/or receive data on the same channel and/or during the same time. For example, the processor 620 may receive a beacon broadcast by the external electronic device 410 and perform NAN cluster synchronization based on time clock information of the external electronic device 410 included in the beacon.

After the NAN cluster synchronization is completed, the processor 620 may operate in the first communication mode. The first communication mode may be a mode that performs data transmission and/or reception for each DW having an interval of a first value. The processor 620 operating in the first communication mode may activate the communication circuit 610 for each specified interval (e.g., a size of a DW having an interval of a first value) and receive data transmitted by the electronic devices (e.g., the external electronic device 410) included in the NAN cluster for each specified interval or transmit data to the external electronic device 410.

The processor 620 operating in the first communication mode may perform a series of operations for switching to the second communication mode based on whether various conditions are satisfied. The second communication mode may indicate a communication mode that may have lower power consumption than that of the first communication mode or a communication mode in which the external electronic device 410 instead of the electronic device 600 performs some of functions performed by the electronic device 600 in the first communication mode.

The second communication mode may be a mode operating as an awake interval having a second value (e.g., awake interval=4) greater than a first value (e.g., awake interval=3), which is a length of the awake interval of the first communication mode. For example, in the first communication mode, the processor 620 may activate the communication circuit 610 on one DW (e.g., every four DW intervals) of four DWs. In the second communication mode, the processor 620 may activate the communication circuit 610 on one DW among eight DWs (e.g., every eight DW intervals).

The second communication mode may be a mode that transmits or receives data using a frequency band lower than a frequency band used by the first communication mode. For example, the processor 620 may control the communication circuit 610 to transmit or receive data using both a channel of a frequency band of 2.4 GHz and a channel of a frequency band of 5 GHz in the first communication mode. The processor 620 may control the communication circuit 610 to transmit or receive data using a channel of a frequency band of 2.4 GHz in the second communication mode.

The second communication mode may be a communication mode that operates only some of services operated through the first communication mode. For example, a screen sharing service among services operated through the first communication mode may be a service that is not supported in the second communication mode.

The second communication mode may not support post initiation communication (e.g., further service discovery, ranging, or NDP), which is an operation that performs data transmission and/or reception between DWs among operations supported by the first communication mode.

The second communication mode may be a communication mode in which the external electronic device 410 instead of the electronic device 600 performs an operation in which the electronic device 600 configures post initiation communication in relation to post initiation communication (e.g., further service discovery, ranging, or NDP), which is an operation that performs data transmission and/or reception between DWs among operations supported by the first communication mode.

The second communication mode may be a mode that does not perform a scan (e.g., a passive scan that scans a signal transmitted by another external electronic device or an active scan that scans an external electronic device in a method that transmits a signal to another external electronic device) of another external electronic device in order to perform synchronization of NAN clusters or merging of NAN clusters. However, the first communication mode may be a mode that scans another external electronic device in order to perform synchronization of NAN clusters or merging of NAN clusters.

According to an embodiment, the processor 620 may switch to the second communication mode based on a state of the electronic device 600.

For example, the state of the electronic device 600 may indicate various states including a remaining capacity of a battery of the electronic device 600, a temperature of a portion of the electronic device 600, whether a specific component (e.g., display (e.g., the display module 160 of FIG. 1, comprising a display)) of the electronic device 600 is activated, and whether a low power mode of the electronic device 600 is executed.

The processor 620 may identify that the remaining capacity of the battery of the electronic device 600 is equal to or less than a designated value and determine to switch from the first communication mode to the second communication mode.

The processor 620 may identify that a temperature of the electronic device 600 is equal to or greater than a designated value and determine to switch from the first communication mode to the second communication mode.

The processor 620 may identify that a specific component (e.g., the display 160 from FIG. 1) of the electronic device 600 is deactivated and determine to switch from the first communication mode to the second communication mode.

The processor 620 may identify that a low power mode of the electronic device 600 is activated by a user input and determine to switch from the first communication mode to the second communication mode.

As part of an operation of switching to the second communication mode, the processor 620 may discover (or search for) an electronic device (e.g., the external electronic device 410) capable of operating as a proxy server among electronic devices included in the NAN cluster.

The processor 620 may receive a signal broadcast by the electronic device (e.g., the external electronic device 410) included in the NAN cluster in the DW and identify information indicating whether the proxy server function included in the signal is supported. The signal may be one of a beacon broadcast in a DW, a service discovery frame, and/or a NAN action frame. The processor 620 may search for the external electronic device 410 that may operate as a proxy server based on a result of identifying information indicating whether the proxy server function is supported.

The processor 620 may transmit a proxy registration request signal to the found external electronic device 410.

The proxy registration request signal may include information related to the second communication mode.

The proxy registration request signal may include awake interval information of the second communication mode. A size of the awake interval of the second communication mode may be greater than that of the awake interval of the first communication mode.

The proxy registration request signal may include information (or channel information) of a frequency band (e.g., 2.4 GHz) supportable in the second communication mode.

According to an embodiment, the proxy registration request signal may include information related to a function (or service) in which the external electronic device 410 may perform instead of the electronic device 600 while the electronic device 600 operates in the second communication mode. Information related to a function in which the external electronic device 410 may perform instead of the electronic device 600 may include a function type (e.g., identification information of a passive scan and/or post initiation communication) and/or configuration information (e.g., further availability window (FAW) information indicating a time in which the communication circuit 610 is activated at a time other than the DW) for performing post initiation communication.

According to an embodiment, the proxy registration request signal may include performance information of the electronic device 600. The performance information of the electronic device 600 may include performance information of the proxy client. For example, the performance information of the electronic device 600 may include information indicating an operation mode (e.g., first communication mode or second communication mode) of the electronic device 600 and/or the number of antennas used by the electronic device 600.

Performance information of the electronic device 600 included in the proxy registration request signal transmitted in the first communication mode and performance information of the electronic device 600 included in the proxy registration request signal transmitted in the second communication mode may be different. According to an embodiment, the number (e.g., four) of antennas included in the performance information of the electronic device 600 included in the proxy registration request signal transmitted in the first communication mode and the number (e.g., two) of antennas included in performance information of the electronic device 600 included in the proxy registration request signal transmitted in the second communication mode may be different.

According to an embodiment, the proxy registration request signal may include timeout information of at least some of information included therein. For example, the external electronic device 410 that has received the proxy registration request signal may delete (or ignore) information included in the proxy registration request signal as timeout information expires, and end a proxy server operation for the electronic device 600. The external electronic device 410 may transmit a proxy registration termination message to the electronic device 600.

The external electronic device 410 may receive the proxy registration request signal and transmit a response message (e.g., proxy registration response message) on whether proxy registration of the electronic device 600 to the electronic device 600 in response to the proxy registration request. According to an embodiment, the response message may include information (e.g., status) on acceptance or rejection for the proxy registration request of the electronic device 600. According to an embodiment, in the case that the external electronic device 410 accepts the proxy registration request of the electronic device 600, the response message may include registration information (e.g., registration ID information (e.g., registration ID B)) allocated to the electronic device 600.

As the proxy client registration is completed, the processor 620 may control the communication circuit 610 to operate in a second communication mode.

In the second communication mode, the processor 620 may enable the external electronic device 410 to perform some of functions performed by the electronic device 600 in a first communication mode.

According to an embodiment, in the second communication mode, the processor 620 may not perform an operation of scanning another external electronic device in order to perform synchronization of NAN clusters or merging of NAN clusters. The external electronic device 410 may scan another external electronic device in order to perform synchronization of NAN clusters or merging of NAN clusters and determine whether to merge NAN clusters based on the scan result. Corresponding to merging the NAN cluster with another cluster, the external electronic device 410 may transmit information indicating merging to the electronic device 600 within a DW interval in which the electronic device 600 is activated. The processor 620 may perform a series of operations for merging the NAN cluster with another NAN cluster upon receiving information indicating the merging. The processor 620 may perform a proxy function on a new NAN cluster in which the NAN cluster in which the electronic device 600 is previously included and another NAN cluster are merged.

Accordingly, as the electronic device 600 is not merged into a new cluster but the external electronic device 410 is merged into the new cluster, the electronic device 600 may prevent or educe power consumption due to a scan operation for finding another external electronic device operating as a proxy server.

According to an embodiment, in the second communication mode, the processor 620 may not perform an operation in which the electronic device 600 configures post initiation communication in relation to post initiation communication (e.g., further service discovery, ranging, or NDP), which is an operation of performing data transmission and/or reception between DWs. The external electronic device 410 instead of the electronic device 600 may perform an operation of configuring post initiation communication. For example, the external electronic device 410 may perform a post initiation communication configuration (or negotiation) with another external electronic device to be connected, directly or indirectly, to the electronic device 600, and transmit configuration information to the electronic device 600 within a DW interval in which the electronic device 600 is activated. The processor 620 may perform post initiation communication based on the received configuration information. Accordingly, the electronic device 600 may prevent or reduce power consumption due to a configuration operation of post initiation communication.

The processor 620 may transmit a signal for identifying a connection state between the external electronic device 410 and the electronic device 600 to the external electronic device 410 every designated cycle while operating in the second communication mode. A signal for identifying a connection state between the external electronic device 410 and the electronic device 600 may be transmitted and received on a DW interval, which is an interval in which the electronic device 600 may transmit and/or receive data. The processor 620 may identify that a response signal of a signal for identifying a connection state between the external electronic device 410 and the electronic device 600 is not received, and discovering (or searching for) another external electronic device capable of serving as a proxy server and maintain a second communication mode in a method of transmitting and registering a proxy registration request message to the found external electronic device. According to an embodiment, the processor 620 may search for an external electronic device while maintaining an awake interval in a process of discovering the external electronic device. Alternatively, the processor 620 may reduce an awake interval in a process of discovering an external electronic device and discover the external electronic device. In the case that the found external electronic device does not exist, the processor 620 may switch from the second communication mode to the first communication mode.

According to an embodiment, the processor 620 may switch back from the second communication mode to the first communication mode based on a state of the electronic device 600.

For example, the state of the electronic device 600 may indicate various states including a remaining capacity of a battery of the electronic device 600, a temperature of a portion of the electronic device 600, whether a specific component (e.g., display (e.g., the display module 160 of FIG. 1)) of the electronic device 600 is activated, and whether a low power mode of the electronic device 600 is terminated.

The processor 620 may identify that the remaining capacity of the battery of the electronic device 600 is equal to or greater than a designated value and determine to switch from the second communication mode to the first communication mode.

The processor 620 may identify that a temperature of the electronic device 600 is equal to or less than a designated value, and determine to switch from the second communication mode to the first communication mode.

The processor 620 may identify that a specific component (e.g., the display 160) of the electronic device 600 is activated and determine to switch from the second communication mode to the first communication mode.

The processor 620 may identify that a low power mode of the electronic device 600 is terminated by a user input and determine to switch from the second communication mode to the first communication mode.

Figure 7:
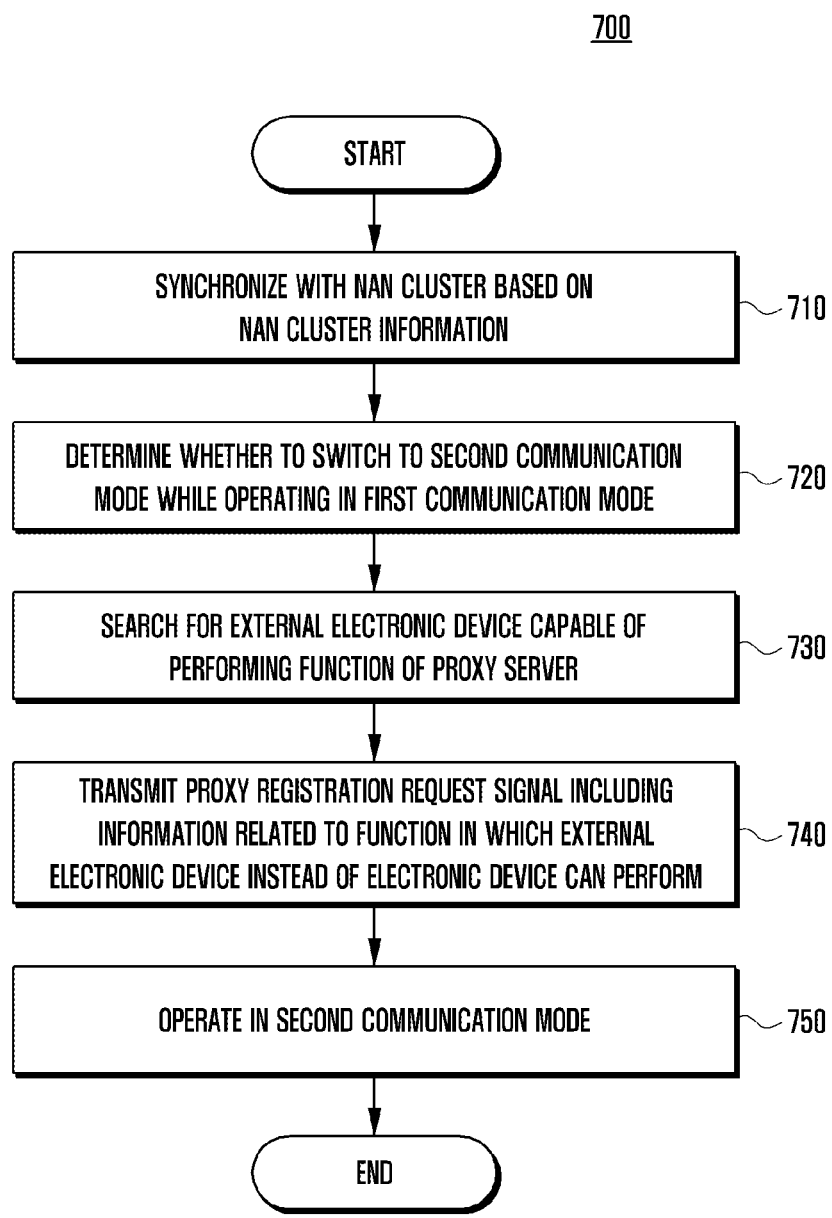
FIG. 7 is an operation flowchart illustrating a method of operating an electronic device according to various example embodiments.

FIG. 7 is an operation flowchart illustrating a method 700 of operating an electronic device according to various example embodiments. Each embodiment herein may be used in combination with any other embodiment(s) described herein.

The electronic device (e.g., the electronic device 600 of FIG. 6) may perform synchronization with the NAN cluster based on NAN cluster information included in a signal broadcast by an external electronic device (e.g., the first electronic device 410 of FIG. 4) included in the cluster (or network) (e.g., the NAN cluster 200 of FIG. 2) implemented in a NAN method in operation 710.

NAN cluster synchronization may include an operation of receiving time clock information of an electronic device representing the NAN cluster so that the electronic devices included in the NAN cluster transmit and/or receive data on the same channel and/or during the same time. For example, the electronic device 600 may receive a beacon broadcast by the external electronic device 410 and perform NAN cluster synchronization based on dine clock information of the external electronic device 410 included in the beacon.

After the NAN cluster synchronization is completed, the electronic, device 600 may operate in a first communication mode. The first communication mode may be a mode that performs data transmission and/or reception for each DW having an interval of a first value. The electronic device 600 operating in the first communication mode may activate the communication circuit 610 at every specified interval (e.g., a size of a DW having an interval of a first value) and receive data transmitted by the electronic devices (e.g., the external electronic device 410) included in the NAN cluster at each specified interval or transmit data to the external electronic device 410.

In operation 720, the electronic device 600 may determine whether to switch to the second communication mode while operating in the first communication mode.

The electronic device 600 operating in the first communication mode may perform a series of operations for switching to the second communication mode based on whether various conditions are satisfied. The second communication mode may be a communication mode that may have lower power consumption than that of the first communication mode or a communication mode in which the external electronic device 410 instead of the electronic device 600 performs some of functions performed by the electronic device 600 in the first communication mode.

A second communication mode may be a mode operating as an awake interval having a second value (e.g., awake interval=4) greater than a first value (e.g., awake interval=3), which is a length of the awake interval of the first communication mode. For example, in the first communication mode, the electronic device 600 may activate the communication circuit 610 on one DW of four DWs (e.g., every four DW intervals). In the second communication mode, the processor 620 may activate the communication circuit 610 on one DW among eight DWs (e.g., every eight DW intervals).

The second communication mode may be a mode that transmits or receives data using a frequency band lower than a frequency band used by the first communication mode. For example, the processor 620 may control the communication circuit 610 to transmit or receive data using both a channel of a frequency band of 2.4 GHz and a channel of a frequency band of 5 GHz in the first communication mode. The electronic device 600 may control the communication circuit 610 to transmit or receive data using a channel of a frequency band of 2.4 GHz in the second communication mode.

The second communication mode may be a communication mode that operates only some of services operated through the first communication mode. For example, a screen sharing service among services operated through the first communication mode may be a service that is not supported in the second communication mode.

The second communication mode may not support post initiation communication (e.g., further service discovery, ranging, or NDP), which is an operation that performs data transmission and/or reception between DWs among operations supported by the first communication mode.

The second communication mode may be a communication mode in which the external electronic device 410 instead of the electronic device 600 performs an operation in which the electronic device 600 configures post initiation communication in relation to post initiation communication (e.g., further service discovery, ranging, or NDP), which is an operation that performs data transmission and/or reception between DWs among operations supported by the first communication mode.

The second communication mode may be a mode that does not scan (e.g., a passive scan that scans a signal transmitted by another external electronic device or an active scan that scans an external electronic device in a method that transmits a signal to the external electronic device) another external electronic device in order to perform synchronization of NAN clusters or merging of NAN clusters. However, the first communication mode may be a mode that scans another external electronic device in order to perform synchronization of NAN clusters or merging of NAN clusters.

According to an embodiment, the electronic device 600 may switch to the second communication mode based on a state thereof.

For example, the state of the electronic device 600 may indicate various states including a remaining capacity of a battery of the electronic device 600, a temperature of a portion of the electronic device 600, whether a specific component (e.g., display (e.g., the display module 160 of FIG. 1)) of the electronic device 600 is activated, and whether a low power mode of the electronic device 600 is executed.

The electronic device 600 may identify that the remaining capacity of the battery thereof is equal to or less than a designated value and determine to switch from the first communication mode to the second communication mode.

The electronic device 600 may identify that a temperature thereof is equal to or greater than a designated value and determine to switch from the first communication mode to the second communication mode.

The electronic device 600 may identify that a specific component (e.g., the display 160 from FIG. 1) thereof is deactivated and determine to switch from the first communication mode to the second communication mode.

The electronic device 600 may identify that a low power mode thereof is activated by a user input, and determine to switch from the first communication mode to the second communication mode.

The electronic device 600 may search for the external electronic device 410 capable of performing a function of a proxy server in operation 730.

The electronic device 600 may receive a signal broadcast by the electronic device (e.g., the external electronic device 410) included in the NAN duster in the DW and identify information indicating whether a proxy server function included in the signal is supported. The signal may be one of a beacon broadcast in a DW, a service discovery frame, and/or a NAN action frame. The electronic device 600 may search for the external electronic device 410 capable of operating as a proxy server based on a result of identifying information indicating whether the proxy server function is supported.

In operation 740, the electronic device 600 may transmit a proxy registration request signal including information related to a function in which the external electronic device 410 instead of the electronic device 600 can perform.

The proxy registration request signal may include information related to the second communication mode.

The proxy registration request signal may include awake interval information of the second communication mode. A size of the awake interval of the second communication mode may be greater than that of the awake interval of the first communication mode.

The proxy registration request signal may include information (or channel information) of a frequency band (e.g., 2.4 GHz) supportable in the second communication mode.

According to an embodiment, the proxy registration request signal may include information related to a function (or service) in which the external electronic device 410 instead of the electronic device 600 can perform while the electronic device 600 operates in the second communication mode. Information related to a function in which the external electronic device 410 instead of the electronic device 600 can perform may include a function type (e.g., identification information of a passive scan and/or post initiation communication) and/or configuration information (e.g., further availability window (FAV) information indicating a time in which the communication circuit 610 is activated at a time other than the DW) for performing post initiation communication.

According to an embodiment, the proxy registration request signal may include performance information of the electronic device 600. The performance information of the electronic device 600 may include performance information of the proxy client. For example, the performance information of the electronic device 600 may include information indicating an operation mode (e.g., first communication mode or second communication mode) of the electronic device 600 and/or the number of antennas used by the electronic device 600.

Performance information of the electronic device 600 included in the proxy registration request signal transmitted in the first communication mode and performance information of the electronic device 600 included in the proxy registration request signal transmitted in the second communication mode may be different.

According to an embodiment, the proxy registration request signal may include timeout information of at least some of information included therein. For example, as timeout information expires, the external electronic device 410 that has received the proxy registration request signal may delete (or ignore) information included in the proxy registration request signal and end a proxy server operation for the electronic device 600. The external electronic device 410 may transmit a proxy registration termination message to the electronic device 600.

The external electronic device 410 may receive the proxy registration request signal and transmit a response message (e.g., proxy registration response message) on whether proxy registration of the electronic device 600 to the electronic device 600 in response to the proxy registration request. According to an embodiment, the response message may include information (e.g., status) on acceptance or rejection for the proxy registration request of the electronic device 600.

In operation 750, as the proxy client registration is completed, the electronic device 600 may operate in the second communication mode.

In the second communication mode, the electronic device 600 may enable the external electronic device 410 to perform some of functions performed by the electronic device 600 in the first communication mode.

According to an embodiment, in the second communication mode, the electronic device 600 may not perform an operation of scanning another external electronic device in order to perform synchronization of NAN clusters or merging of NAN clusters. In order to perform synchronization of NAN clusters or merging of NAN clusters, the external electronic device 410 may scan another external electronic device and determine whether to merge NAN clusters based on the scan result. Corresponding to merging the NAN cluster with another cluster, the external electronic device 410 may transmit information indicating merging to the electronic device 600 within a DW interval in which the electronic device 600 is activated. Upon receiving information indicating merging, the electronic device 600 may perform merging and perform a series of operations for merging the NAN cluster with another NAN cluster. The electronic device 600 may perform a proxy function on a new NAN cluster in which the NAN cluster in which the electronic device 600 is previously included and another NAN cluster are merged. Accordingly, as the electronic device 600 is not merged into the new cluster and the external electronic device 410 is merged into the new cluster, the electronic device 600 may prevent or reduce power consumption due to a scan operation for finding another external electronic device that operates as a proxy server.

According to an embodiment, in the second communication mode, the electronic device 600 may not perform an operation in which the electronic device 600 configures post initiation communication in relation to post initiation communication (e.g., further service discovery, ranging, or NDP), which is an operation of performing data transmission and/or reception between DWs. The external electronic device 410 instead of the electronic device 600 may perform an operation of configuring post initiation communication. For example, the external electronic device 410 may perform a post initiation communication configuration (or negotiation) with another external electronic device to be connected to the electronic device 600 and transmit the configuration information to the electronic device 600 within a DW interval in which the electronic device 600 is activated. The electronic device 600 may perform post initiation communication based on the received configuration information. Accordingly, the electronic device 600 may prevent or reduce power consumption due to the configuration operation of post initiation communication.

Figure 8:
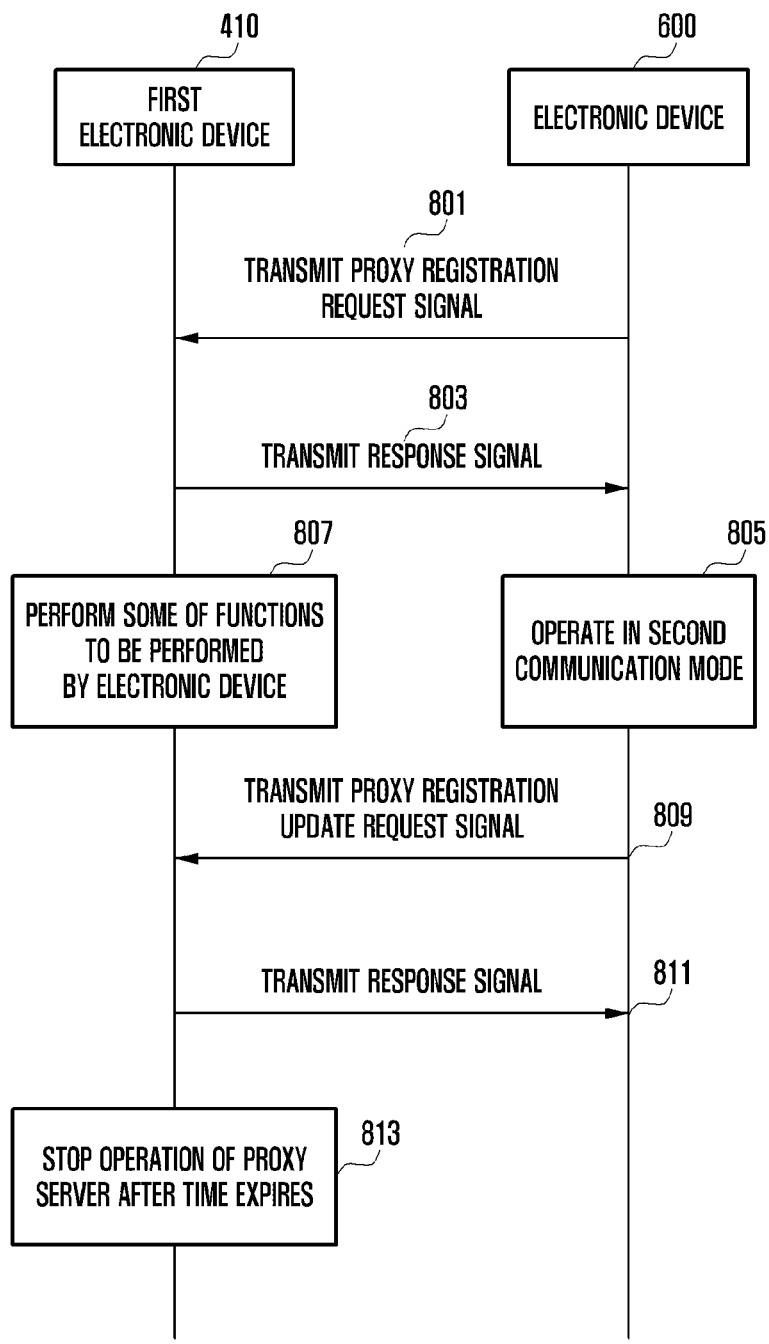
FIG. 8 is a message flow diagram illustrating an embodiment in which an external electronic device performs instead a function to be performed by the electronic device while the electronic device operates in a second communication mode according to various example embodiments.

FIG. 8 is a message flow diagram illustrating an embodiment in which an external electronic device performs instead a function to be performed by the electronic device while the electronic device operates in a second communication mode according to various example embodiments.

The electronic device (e.g., the electronic device 600 of FIG. 6) may transmit a proxy registration request signal to an external electronic device (e.g., the first electronic device 410 of FIG. 4) in operation 801.

The proxy registration request signal may include information related to the second communication mode.

The proxy registration request signal may include awake interval information of the second communication mode. A size of the awake interval of the second communication mode may be greater than that of the awake interval of the first communication mode.

The proxy registration request signal may include information (or channel information) of a frequency band (e.g., 2.4 GHz) supportable in the second communication mode.

According to an embodiment, the proxy registration request signal may include information related to a function (or service) in which the external electronic device 410 instead of the electronic device 600 can perform while the electronic device 600 operates in the communication mode. The information related to a function in which the external electronic device 410 may perform instead of the electronic device 600 may include a function type (e.g., identification information of a passive scan and/or post initiation communication) and/or configuration information (e.g., further availability window (FAW) information indicating a time in which the communication circuit 610 is activated at a time other than the DW) for performing post initiation communication.

According to an embodiment, the proxy registration request signal may include performance information of the electronic device 600. The performance information of the electronic device 600 may include performance information of the proxy client. For example, the performance information of the electronic device 600 may include information indicating an operation mode (e.g., first communication mode or second communication mode) of the electronic device 600 and/or the number of antennas used by the electronic device 600.

Performance information of the electronic device 600 included in the proxy registration request signal transmitted in the first communication mode and performance information of the electronic device 600 included in the proxy registration request signal transmitted in the second communication mode may be different. According to an embodiment, the number (e.g., four) of antennas included in the performance information of the electronic device 600 included in the proxy registration request signal transmitted in the first communication mode and the number (e.g., two) of antennas included in the performance information of the electronic device 600 included in the proxy registration request signal transmitted in the second communication mode may be different.

According to an embodiment, the proxy registration request signal may include timeout information of at least some of information included therein. For example, the external electronic device 410 that has received the proxy registration request signal may delete (or ignore) information included in the proxy registration request signal as timeout information expires, and end a proxy server operation for the electronic device 600. The external electronic device 410 may transmit a proxy registration termination message to the electronic device 600.

The external electronic device 410 may transmit a response signal corresponding to the proxy registration request signal in operation 803.

The external electronic device 410 may receive the proxy registration request signal, and transmit a response message (e.g., proxy registration response message) on whether proxy registration of the electronic device 600 to the electronic device 600 in response to the proxy registration request. According to an embodiment, the response message may include information (e.g., status) on acceptance or rejection for the proxy registration request of the electronic device 600. According to an embodiment, in the case that the external electronic device 410 accepts the proxy registration request of the electronic device 600, the response message may include registration information (e.g., registration ID information (e.g., registration ID B)) allocated to the electronic device 600.

The electronic device 600 may operate in the second communication mode in operation 805. The external electronic device 410 may perform some of functions to be performed by the electronic device 600 in operation 807.

In the second communication mode, the electronic device 600 may enable the external electronic device 410 to perform some of functions performed by the electronic device 600 in the first communication mode.

According to an embodiment, in the second communication mode, in order to perform synchronization of NAN clusters or merging of NAN clusters, the electronic device 600 may not perform an operation of scanning another external electronic device. In order to perform synchronization of NAN clusters or merging of NAN clusters, the external electronic device 410 may scan another external electronic device, and determine whether to merge NAN clusters based on the scan result. Corresponding to merging the NAN cluster with another cluster, the external electronic device 410 may transmit information indicating merging to the electronic device 600 within a DW interval in which the electronic device 600 is activated. The electronic device 600 may perform a series of operations for merging the NAN cluster with another NAN cluster upon receiving the information indicating the merging. The electronic device 600 may perform a proxy function on a new NAN cluster in which the NAN cluster in which the electronic device 600 is previously included and another NAN cluster are merged. Accordingly, as the electronic device 600 is not merged into the new cluster and the external electronic device 410 is merged into the new cluster, the electronic device 600 may prevent or reduce power consumption due to a scan operation for finding another external electronic device that operates as a proxy server.

According to an embodiment, in the second communication mode, the electronic device 600 may not perform an operation in which the electronic device 600 configures post initiation communication in relation to post initiation communication (e.g., further service discovery, ranging, or NDP), which is an operation of performing data transmission and/or reception between DWs. The external electronic device 410 instead of the electronic device 600 may perform an operation of configuring post initiation communication. For example, the external electronic device 410 may perform a post initiation communication configuration (or negotiation) with another external electronic device to be connected, directly or indirectly, to the electronic device 600, and transmit configuration information to the electronic device 600 within a DW interval in which the electronic device 600 is activated. The electronic device 600 may perform post initiation communication based on the received configuration information. Accordingly, the electronic device 600 may prevent or reduce power consumption due to the configuration operation of post initiation communication.

The electronic device 600 may transmit a proxy registration update request signal to the external electronic device 410 in operation 809.

In order to acquire information related to another service or to change the awake interval, the electronic device 600 may transmit a proxy registration update request message to the external electronic device 410.

The proxy registration update request message may include updated service information and updated awake interval information to be obtained by the electronic device 600.

The external electronic device 410 may transmit a response signal corresponding to the proxy registration update request signal in operation 811.

According to an embodiment, the response message may include information (e.g., status) on acceptance or rejection for the proxy registration request of the electronic device

600. According to an embodiment, in the case that the external electronic device 410 accepts the proxy registration update request of the electronic device 600, the response message may include registration information (e.g., registration ID information (e.g., registration ID B)) allocated to the electronic device 600.

In operation 813, the external electronic device 410 may stop an operation of the proxy server after the time expires.

According to an embodiment, the proxy registration update request signal may include updated timeout information of at least some of information included therein. For example, the external electronic device 410 that has received the proxy registration update request signal may delete (or ignore) information included in the proxy registration request signal as timeout information expires, and end a proxy server operation for the electronic device 600. The external electronic device 410 may transmit a proxy registration termination message to the electronic device 600.

Figure 9:
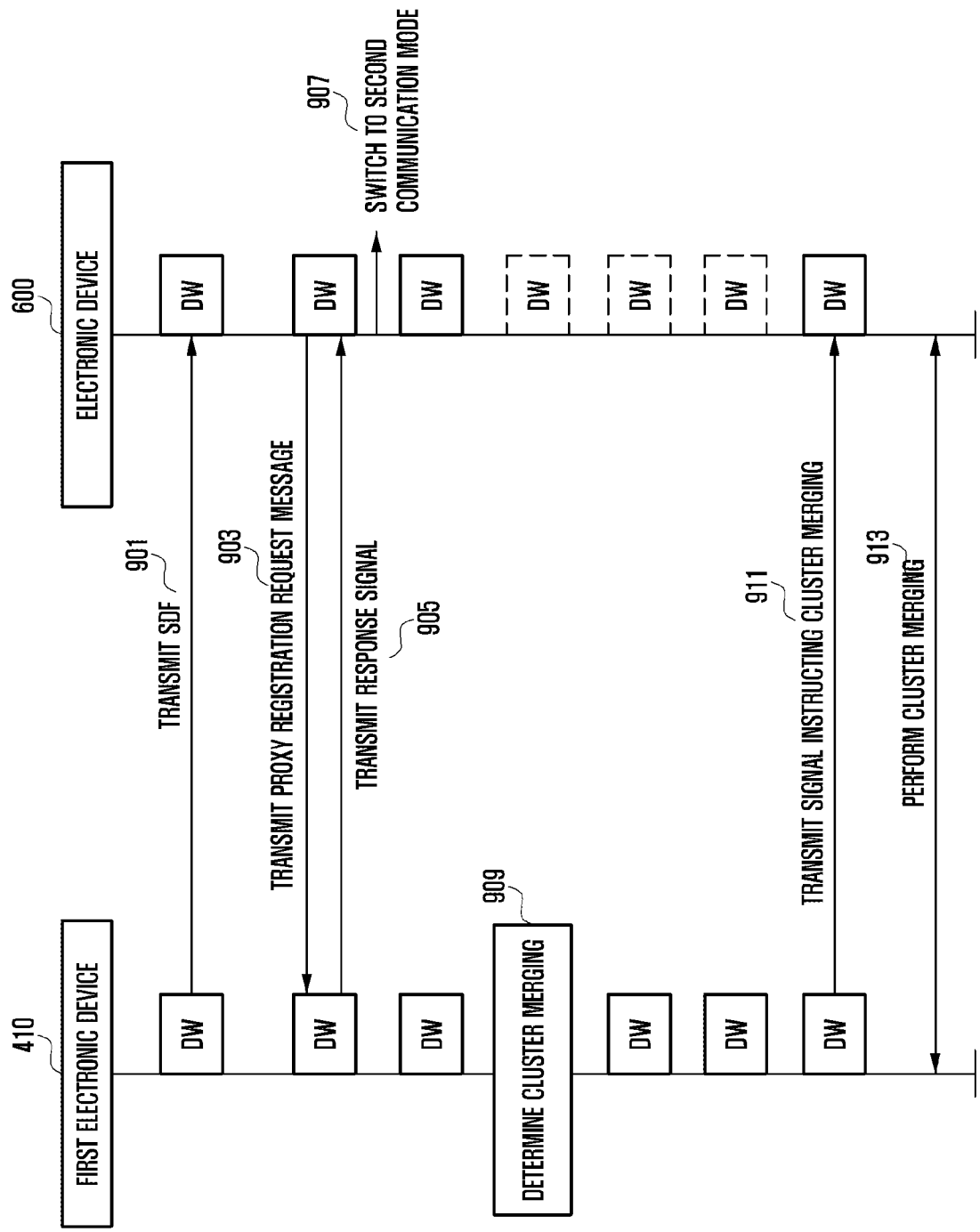
FIG. 9 is a message flow diagram illustrating an embodiment in which an electronic device performs cluster merging without performing a passive scan according to various example embodiments.

FIG. 9 is a message flow diagram illustrating an embodiment in which an electronic device performs cluster merging without performing a passive scan according to various example embodiments.

In operation 901, the external electronic device (e.g., the first electronic device 410 of FIG. 4) may transmit (or broadcast) a service discovery frame (SDF) to the electronic device (e.g., the electronic device 600 of FIG. 6).

The SDF may include information indicating whether the proxy server function is supported. The external electronic device 410 may broadcast the SDF during the DW interval.

Information indicating whether the proxy server function is supported may include proxy server capability information and/or awake interval information (e.g., DW awake interval).

The electronic device 600 may identify information indicating whether the electronic device 600 supports the proxy server function included in the SDF broadcast by the external electronic device 410 and identify whether the external electronic device 410 operates as a proxy server.

The electronic device 600 may operate in the first communication mode. The first communication mode may be a mode that performs data transmission and/or reception for each DW having an interval of a first value. The electronic device 600 operating in the first communication mode may activate the communication circuit 610 every specified interval (e.g., a size of a DW having an interval of a first value) and receive data transmitted by the electronic devices (e.g., the external electronic device 410) included in the NAN cluster at each specified interval or transmit data to be external electronic device 410.

The electronic device 600 may determine whether to switch to the second communication mode while operating in the first communication mode.

The electronic device 600 operating in the first communication mode may perform a series of operations for switching to the second communication mode based on whether various conditions are satisfied. The second communication mode may be a communication mode that may have lower power consumption than that of the first communication mode or a communication mode in which the external electronic device 410 instead of the electronic device 600 performs some of functions performed by the electronic device 600 in the first communication mode.

The second communication mode may be a mode operating as an awake interval having a second value (e.g., awake interval=4) greater than a first value (e.g., awake interval=3), which is a length of the awake interval of the first communication mode. For example, in the first communication mode, the electronic device 600 may activate the communication circuit 610 on one DW of four DWs (e.g., every four UK intervals). In the second communication mode, the processor 620 may activate the communication circuit 610 on one DW among eight DWs (e.g., every eight DW intervals).

The second communication mode may be a mode that transmits or receives data using a frequency band lower than a frequency band used in the first communication mode. For example, the processor 620 may control the communication circuit 610 to transmit or receive data using both a channel of a frequency band of 2.4 GHz and a channel of a frequency band of 5 GHz in the first communication mode. The electronic device 600 may control the communication circuit 610 to transmit or receive data using a channel of a frequency band of 2.4 GHz in the second communication mode.

The second communication mode may be a communication mode that operates only some of services operated in the first communication mode. For example, a screen sharing service among services operated in the first communication mode may be a service that is not supported in the second communication mode.

The second communication mode may not support post initiation communication (e.g., further service discovery, ranging, or NDP), which is an operation that performs data transmission and/or reception between DWs among operations supported in the first communication mode.

The second communication mode may be a communication mode in which the external electronic device 410 instead of the electronic device 600 performs an operation in which the electronic device 600 configures post initiation communication in relation to post initiation communication (e.g., further service discovery, ranging, or NDP), which is an operation that performs data transmission and/or reception between DWs among operations supported in the first communication mode.

The second communication mode may be a mode that does not perform a scan (e.g., a passive scan that scans a signal transmitted by another external electronic device or an active scan that scans an external electronic device in a method of transmitting a signal to another external electronic device) of another external electronic device in order to perform synchronization of NAN clusters or merging of NAN clusters. However, the first communication mode may be a mode that scans another external electronic device in order to perform synchronization of NAN clusters or merging of NAN clusters.

According to an embodiment, the electronic device 600 may switch to the second communication mode based on a state thereof.

The electronic device 600 may transmit a proxy registration request message to the external electronic device 410 in operation 903.

The proxy registration request signal may include information related to the second communication mode.

The proxy registration request signal may include awake interval information of the second communication mode. A size of the awake interval of the second communication mode may be greater than that of the awake interval of the first communication mode.

The proxy registration request signal may include information (or channel information) of a frequency band (e.g., 2.4 GHz) supportable in the second communication mode.

According to an embodiment, the proxy registration request signal may include information related to a function (or service) in which the external electronic device 410 instead of the electronic device 600 may perform while the electronic device 600 operates in the second communication mode. Information related to a function in which the external electronic device 410 instead of the electronic device 600 may perform may include a function type (e.g., identification information of a passive scan and/or post initiation communication) and/or configuration information (e.g., further availability window (FAW) information indicating a time in which the communication circuit 610 is activated at a time other than the DW) for performing post initiation communication.

According to an embodiment, the proxy registration request signal may include performance information of the electronic device 600. The performance information of the electronic device 600 may include performance information of the proxy client. For example, the performance information of the electronic device 600 may include information indicating an operation mode (e.g., first communication mode or second communication mode) of the electronic device 600 and/or the number of antennas used by the electronic device 600.

Performance information of the electronic device 600 included in the proxy request signal transmitted in the first communication mode and performance information of the electronic device 600 included in the proxy registration request signal transmitted in the second communication mode may be different. According to an embodiment, the number (e.g., four) of antennas included in the performance information of the electronic device 600 included in the proxy registration request signal transmitted in the first communication mode and the number (e.g., two) of antennas included in the performance information of the electronic device 600 included in the proxy registration request signal transmitted in the second communication mode may be different.

According to an embodiment, the proxy registration request signal may include timeout information of at least some of information included therein. For example, the external electronic device 410 that has received the proxy registration request signal may delete (or ignore) information included in the proxy registration request signal as timeout information expires and end a proxy server operation for the electronic device 600. The external electronic device 410 may transmit a proxy registration termination message to the electronic device 600.

The external electronic device 410 may transmit a response signal the electronic device 600 in operation 905.

The external electronic device 410 may receive the proxy registration request signal and transmit a response message (e.g., proxy registration response message) on whether proxy registration of the electronic device 600 to the electronic device 600 in response to the proxy registration request. According to an embodiment, the response message may include information (e.g., status) on acceptance or rejection for the proxy registration request of the electronic device 600. According to an embodiment, in the case that the external electronic device 410 accepts the proxy registration request of the electronic device 600, the response message may include registration information (e.g., registration ID information (e.g., registration ID B)) allocated to the electronic device 600.

The electronic device 600 may switch to the second communication mode in operation 907.

As the registration of the proxy client is completed, the electronic device 600 may operate in the second communication mode. In the second communication mode, the electronic device 600 may enable the external electronic device 410 to perform some of functions performed by the electronic device 600 in the first communication mode.

According to an embodiment, in the second communication mode, in order to perform synchronization of NAN clusters or merging of NAN clusters, the electronic device 600 may not perform an operation of scanning another external electronic device. In order to perform synchronization of NAN clusters or merging of NAN clusters, the external electronic device 410 may scan another external electronic device.

The external electronic device 410 may determine cluster merging in operation 909.

The external electronic device 410 may receive the SDF transmitted by the other external electronic device while scanning the other external electronic device. The received SDF may include a preference for a NAN cluster including other external electronic devices. The external electronic device 410 may compare a preference of the NAN cluster included in the received SDF with a preference of the NAN cluster including the external electronic device 410 and the electronic device 600, and determine whether to merge NAN clusters based on the comparison result. Corresponding identifying that a preference of the NAN cluster included in the received SDF is higher than that of the NAN cluster including the external electronic device 410 and the electronic device 600, the external electronic device 410 may determine to merge NAN clusters.

The external electronic device 410 may transmit a signal instructing cluster merging to the electronic device 600 in operation 911.

Corresponding to merging the NAN cluster with another cluster, the external electronic device 410 may transmit information indicating merging to the electronic device 600 within a DW interval in which the electronic device 600 is activated.

The external electronic device 410 and the electronic device 600 may perform cluster merging in operation 913.

Upon receiving information indicating merging, the electronic device 600 may perform merging and perform a proxy function through another proxy server. Accordingly, the electronic device 600 may prevent or reduce power consumption due to the scan operation.

Figure 10:
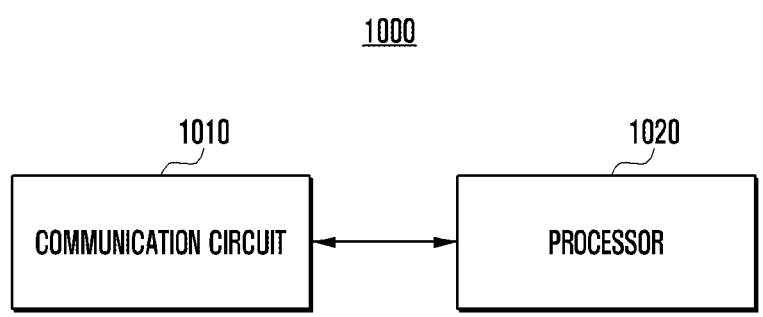
FIG. 10 is a block diagram illustrating an electronic device according to various example embodiments.

FIG. 10 is a block diagram illustrating an electronic device according to various example embodiments.

According to various example embodiments, an electronic device (e.g., the first electronic device 410 of FIG. 4) 1000 may include a communication circuit 1010 (e.g., the wireless communication module 192 of FIG. 1, comprising communication circuitry) and a processor 1020 (e.g., the processor 120 of FIG. 1, including processing circuitry).

The communication circuit 1010 may include various circuit structures used for modulation and/or demodulation of a signal in the electronic device 1000. For example, the communication circuit 1010 may modulate a signal of a baseband to a signal of a radio frequency (RF) band so as to output the signal of the baseband through an antenna (not illustrated) or demodulate a signal of an RF band received through the antenna to a signal of a base band and transmit the signal to the processor 1020.

The communication circuit 1010 may transmit or receive various data to or from an external electronic device (e.g., the electronic device 600 of FIG. 6) through a frequency band (e.g., 2.4 GHz, 5 GHz, and/or 6 GHz) used by electronic devices of the NAN cluster (e.g., the NAN cluster 200 of FIG. 2).

The processor 1020 may perform an operation of generating a packet for receiving data transmitted by an application processor (e.g., the processor 120 of FIG. 1) and transmitting the received data to an external electronic device (e.g., the electronic device 600 of FIG. 6). The processor 1020, comprising processing circuitry, may be a communication processor (or communication processor) included in a communication module (e.g., the wireless communication module 192 of FIG. 1). According to an embodiment, the processor 1020 may perform an operation of generating a packet by performing channel coding based on data transmitted by the application processor (e.g., the application processor 120 of FIG. 1) or identifying whether there is an error in at least a portion of data transmitted by the external electronic device (e.g., the electronic device 600) or may perform an error recovery operation (e.g., hybrid auto repeat request (HARQ)) in the case that an error occurs. Each "module" herein may comprise circuitry.

The processor 1020 may perform synchronization with the NAN cluster based on the NAN cluster information included in a signal broadcast by the external electronic device 600 included in the cluster (or network) (e.g., the NAN cluster 200 of FIG. 2) implemented in a NAN method. Alternatively, the processor 1020 may receive NAN cluster information through a communication method (e.g., short range wireless communication including Wi-Fi or Bluetooth) other than an NAN-based method. For example, the processor 1020 may transmit a probe request signal for finding the external electronic device 600 to be connected through Wi-Fi and perform synchronization with the NAN cluster based on the NAN cluster information included in the probe response message transmitted by the external electronic device 600 corresponding to the probe request signal.

NAN cluster synchronization may include an operation of receiving time clock information of an electronic device representing the NAN cluster so that the electronic devices included in the NAN cluster transmit and/or receive data on the same channel and/or during the same time. For example, the processor 1020 may receive a beacon broadcast by the external electronic device 600 and perform NAN cluster synchronization based on time clock information of the external electronic device 600 included in the beacon.

After NAN cluster synchronization is completed, the processor 1020 may broadcast a service discovery frame including information indicating whether the electronic device 1000 may operate as a proxy server. The service discovery frame may include performance information of the electronic device 1000 operating as a proxy server.

Information indicating whether the proxy server function is supported may include proxy server capability information and/or awake interval information (e.g., DW awake interval).

The processor 1020 may broadcast a service discovery frame including information indicating whether the electronic device 1000 may operate as a proxy server, and receive a proxy registration request message transmitted by the external electronic device 600. As described above with reference to FIGS. 6 to 9, as the external electronic device 600 determines to switch from the first communication mode to the second communication mode, the external electronic device 600 may transmit a proxy registration request message so as to operate as a proxy client.

The proxy registration request signal may include information related to the second communication mode of the external electronic device 600.

The proxy registration request signal may include awake interval information of the second communication mode of the external electronic device 600. A size of the awake interval of the second communication mode may be greater than that of the awake interval of the first communication mode.

The proxy registration request signal may include information (or channel information) of a frequency band (e.g., 2.4 GHz) supportable in the second communication mode of the external electronic device 600.

According to an embodiment, the proxy registration request signal may include information related to a function (or service) in which the electronic device 1000 may perform instead of the external electronic device 600 while the external electronic device 600 operates in the second communication mode. Information related to a function in which the electronic device 1000 may perform instead of the external electronic device 600 may include a function type (e.g., identification information of a passive scan, post and/or initiation communication) and/or configuration information (e.g., further availability window (FAW) information indicating a dine in which the communication circuit (e.g., the communication circuit 610 of FIG. 6) of the external electronic device 600 is activated at a time other than the DW) for performing post initiation communication.

According to an embodiment, the proxy registration request signal may include performance information of the external electronic device 600. The performance information of the external electronic device 600 may include performance information of the proxy client. For example, the performance information of the external electronic device 600 may include information indicating an operation mode (e.g., first communication mode or second communication mode) of the external electronic device 600 and/or the number of antennas used by the external electronic device 600.

According to an embodiment, the proxy registration request signal may include timeout information of at least some information of information included therein. For example, as timeout time information expires, the electronic device 1000 that has received the proxy registration request signal may delete (or ignore) information included in the proxy registration request signal and end a proxy server operation for the external electronic device 600. The processor 1020 may control the communication circuit 1010 to transmit a proxy registration termination message to the external electronic device 600.

The processor 1020 may control the communication circuit 1010 to transmit a response signal corresponding to the proxy registration request signal to the external electronic device 600.

The processor 1020 may receive the proxy registration request signal and transmit a response message (e.g., proxy registration response message) on whether proxy registration of the external electronic device 600 to the external electronic device 600 in response to the proxy registration request. According to an embodiment, the response message may include information (e.g., status) on acceptance or rejection for the proxy registration request of the external electronic device 600. According to an embodiment, in the case that the electronic device 1000 accepts the proxy registration request of the external electronic device 600, the response message may include registration information (e.g., registration ID information (e.g., registration ID B)) allocated to the external electronic device 600.

After transmitting the response signal, the processor 1020 may perform a function included in the proxy registration request signal instead of the external electronic device 600.

According to an embodiment, in the second communication mode, in order to perform synchronization of NAN clusters or merging of NAN clusters, the external electronic device 600 may not perform an operation of scanning another external electronic device. In order to perform synchronization of NAN clusters or merging of NAN clusters, the processor 1020 may scan other external electronic devices and determine whether to merge NAN clusters based on a scan result. The processor 1020 may transmit information indicating merging to the external electronic device 600 within a DW interval in which the external electronic device 600 is activated corresponding to merge the NAN cluster with another cluster. As the external electronic device 600 receives information indicating merging, the external electronic device 600 may perform a series of operations for merging the NAN cluster with another NAN cluster. The external electronic device 600 may perform a proxy function on a new NAN cluster in which the NAN cluster in which the external electronic device 600 is previously included and another NAN cluster are merged.

According to an embodiment, in the second communication mode, the external electronic device 600 may not perform an operation of configuring post initiation communication in relation to post initiation communication (e.g., further service discovery, ranging, or NDP), which is an operation that performs data transmission and/or reception between DWs. The processor 1020 may perform an operation of configuring post initiation communication instead of the electronic device 600. For example, the processor 1020 may perform a post initiation communication configuration (or negotiation) with another external electronic device to be connected to the external electronic device 600, and transmit configuration information to the external electronic device 600 within a DW interval in which the external electronic device 600 is activated. The external electronic device 600 may perform post initiation communication based on the received configuration information.

The processor 1020 may transmit a signal for identifying a connection state between the external electronic device 600 and the electronic device 1000 to the external electronic device 600 every designated cycle while the external electronic device 600 operates in the second communication mode. The signal for identifying the connection state between the external electronic device 600 and the electronic device 1000 may be transmitted and received on the DW interval, which is an interval in which the electronic device 1000 and the external electronic device 600 can transmit and/or receive data. For example, a signal for identifying the connection state between the external electronic device 600 and the electronic device 1000 may be transmitted and received on the DW interval based on awake interval information of the second communication mode of the external electronic device 600. The processor 1020 may identify that the response signal of the signal for identifying the connection state between the external electronic device 600 and the electronic device 1000 is not received, and stop (or terminate) performing a function requested by the external electronic device 600.

The processor 1020 may transmit information of the external electronic device 600 to another external electronic device in consideration of a situation in which the external electronic device 600 is connected to another proxy server according to various causes.

The processor 1020 may receive a service discovery frame transmitted by another external electronic device (not illustrated) through a service discovery procedure. The processor 1020 may identify information indicating whether the electronic device 1000 may operate as a proxy server included in the service discovery frame and identify whether another external electronic device may operate as a proxy server.

The processor 1020 may transmit information of the external electronic device 600 operating as a proxy client registered in the electronic device 1000 to another external electronic device operable as a proxy server.

The information of the external electronic device 600 may include registration information (e.g., registration ID information (e.g., registration ID B)) allocated to the external electronic device 600 and performance information of the external electronic device 600. The registration ID information may be intrinsic information (e.g., MAC address of the external electronic device 600, international mobile subscriber identity (IMSI)) that can distinguish the external electronic device 600 from other electronic devices or information generated based on intrinsic information.

The performance information of the external electronic device 600 may include performance information of the proxy client. For example, the performance information of the external electronic device 600 may include information indicating an operation mode (e.g., first communication mode or second communication mode) of the external electronic device 600 and/or the of antennas used by the external electronic device 600).

The performance information of the external electronic device 600 may include information related to the second communication mode of the external electronic device 600.

The performance information of the external electronic device 600 may include information (or channel information) of a frequency band (e.g., 2.4 GHz) supportable in the second communication mode of the external electronic device 600.

The performance information of the external electronic device 600 may include awake interval information of the second communication mode of the external electronic device 600. A size of the awake interval of the second communication mode may be greater than that of the awake interval of the first communication mode.

The performance information of the external electronic device 600 may include information related to a function (or service) in which the electronic device 1000 may perform instead of the external electronic device 600 while the external electronic device 600 operates in the second communication mode. Information related to a function in which the electronic device 1000 may perform instead of the external electronic device 600 may include a function type (e.g., identification information of a passive scan and/or post initiation communication) and/or configuration information (e.g., further availability window (FAW) information indicating a dine in which the communication circuit (e.g., the communication circuit 610 of FIG. 6) of the external electronic device 600 is activated at a time other than the DW) for performing post initiation communication.

By transmitting information of the external electronic device 600 operating as a proxy client to another external electronic device operating as a proxy server, the electronic device 1000 may enable the external electronic device 600 to use the proxy function without performing a proxy client registration procedure in another external electronic device.

Figure 11:
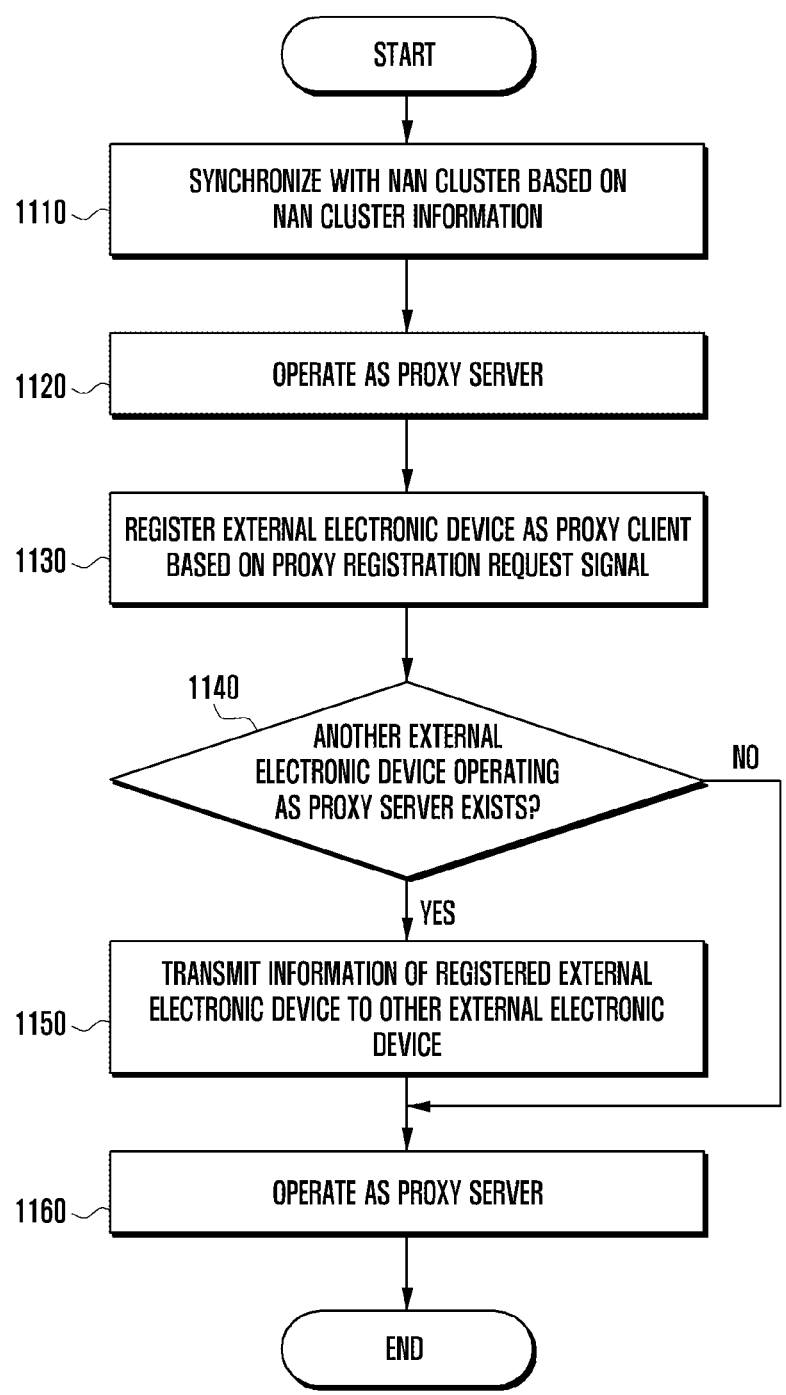
FIG. 11 is an operation flowchart illustrating a method of operating an electronic device according to various example embodiments.

FIG. 11 is an operation flowchart illustrating a method of operating an electronic device according to various example embodiments.

The electronic device (e.g., the electronic device 1000 of FIG. 10) may perform synchronization with the NAN cluster based on NAN cluster information in operation 1110.

The electronic device 1000 may perform synchronization with the NAN cluster based on NAN cluster information included in a signal broadcast by the external electronic device 600 included in the cluster (or network) (e.g., the NAN cluster 200 of FIG. 2) implemented in a NAN method. Alternatively, the electronic device 1000 may receive NAN cluster information through a communication method (e.g., short range wireless communication including Wi-Fi or Bluetooth) other than a NAN-based method. For example, the electronic device 1000 may transmit a probe request signal for finding the external electronic device 600 to be connected through Wi-Fi and perform synchronization with the NAN cluster based on the NAN cluster information included in a probe response message transmitted by the external electronic device 600 corresponding to the probe request signal.

NAN cluster synchronization may include operation of receiving time clock information of an electronic device representing the NAN cluster so that the electronic devices included in the NAN cluster transmits and/or receives data on the same channel and/or during the same time. For example, the electronic device 1000 may receive a beacon broadcast by the external electronic device 600 and perform NAN cluster synchronization based on time clock information of the external electronic device 600 included in the beacon.

The electronic device 1000 may operate as a proxy server after performing synchronization in operation 1120.

After the NAN cluster synchronization is completed, the electronic device 1000 may broadcast a service discovery frame including information indicating whether the electronic device 1000 may operate as a proxy server. The service discovery frame may include performance information of the electronic device 1000 operating as a proxy server.

Information indicating whether the proxy server function is supported may include proxy server capability information and/or awake interval information (e.g., DW awake interval).

In operation 1130, the electronic device 1000 may register an external electronic device (e.g., the electronic device 600 of FIG. 6) as a proxy client based on the proxy registration request signal.

As described above with reference to FIGS. 6 to 9, as the external electronic device 600 determines to switch from the first communication mode to the second communication mode, the external electronic device 600 may transmit a proxy registration request message so as to operate as a proxy client.

The proxy registration request signal may include information related to the second communication mode of the external electronic device 600.

The proxy registration request signal may include awake interval information of the second communication mode of the external electronic device 600. A size of the awake interval of the second communication mode may be greater than that of the awake interval of the first communication mode.

The proxy registration request signal may include information (or channel information) of a frequency band (e.g., 2.4 GHz) supportable in the second communication mode of the external electronic device 600.

According to an embodiment, the proxy registration request signal may include information related to a function (or service) which the electronic device 1000 may perform instead of the external electronic device 600 while the external electronic device 600 operates in the second communication mode. The information related to a function in which the electronic device 1000 may perform instead of the external electronic device 600 may include a function type (e.g., identification information of a passive scan and/or post initiation communication) and/or configuration information (e.g., further availability window (FAW) information indicating a time in which the communication circuit (e.g., the communication circuit 610 of FIG. 6) of the external electronic device 600 is activated at a time other than the DW) for performing post initiation communication.

According to an embodiment, the proxy registration request signal may include performance information of the external electronic device 600. The performance information of the external electronic device 600 may include performance information of the proxy client. For example, the performance information of the external electronic device 600 may include information indicating an operation mode (e.g., first communication mode and second communication mode) of the external electronic device 600 and/or the number of antennas used by the external electronic device 600.

According to an embodiment, the proxy registration request signal may include timeout information of at least some of information included therein. For example, as timeout information expires, the electronic device 1000 that has received the proxy registration request signal may delete (or ignore) information included in the proxy registration request signal and end a proxy server operation for the external electronic device 600. The processor 1020 may control the communication circuit 1010 to transmit a proxy registration termination message to the external electronic device 600.

The electronic device 1000 may control the communication circuit 1010 to transmit a response signal corresponding to the proxy registration request signal to the external electronic device 600.

The electronic device 1000 may receive the proxy registration request signal and transmit a response message (e.g., proxy registration response message) on whether proxy registration of the external electronic device 600 to the external electronic device 600 in response to the proxy registration request. According to an embodiment, the response message may include information (e.g., status) on acceptance or rejection for the proxy registration request of the external electronic device 600. According to an embodiment, in the case that the electronic device 1000 accepts the proxy registration request of the external electronic device 600, the response message may include registration information (registration ID information (e.g., registration ID B)) allocated to the external electronic device 600.

After transmitting the response signal, the electronic device 1000 may perform a function included in the proxy registration request signal instead of the external electronic device 600.

According to an embodiment, in the second communication mode, in order to perform synchronization of NAN clusters or merging of NAN clusters, the external electronic device 600 may not perform an operation of scanning another external electronic device. In order to perform synchronization of NAN clusters or merging of NAN clusters, the electronic device 1000 may scan another external electronic device and determine whether to merge NAN clusters based on the scan result. Corresponding to merging the NAN cluster with another cluster, the electronic device 1000 may transmit information indicating merging to the external electronic device 600 within a DW interval in which the external electronic device 600 is activated. The external electronic device 600 may perform a proxy function through another proxy server upon receiving information indicating merging.

According to an embodiment, in the second communication mode, the external electronic device 600 may not perform an operation of configuring post initiation communication in relation to post initiation communication (e.g., further service discovery, ranging, or NDP), which is an operation that performs data transmission and/or reception between DWs. The electronic device 1000 may perform an operation of configuring post initiation communication instead of the external electronic device 600. For example, the electronic device 1000 may perform a post initiation communication configuration (or negotiation) with another external electronic device to be connected to the external electronic device 600 and transmit configuration information to the external electronic device 600 within a DW interval in which the external electronic device 600 is activated. The external electronic device 600 may perform post initiation communication based on the received configuration information.

In operation 1140, the electronic device 1000 may identify whether another external electronic device operating as a proxy server exists.

The electronic device 1000 may receive a service discovery frame transmitted from another external electronic device (not illustrated) through a service discovery procedure. The electronic device 1000 may identify information indicating whether the electronic device 1000 may operate as a proxy server included in the service discovery frame and identify whether another external electronic device may operate as a proxy server.

In operation 1150, the electronic device 1000 may transmit information of the registered external electronic device 600 to the other external electronic device corresponding to existence of another external electronic device operating as a proxy server (operation 1140-Y).

The electronic device 1000 may transmit information of the external electronic device 600 operating as a proxy client registered in the electronic device 1000 to another external electronic device operable as a proxy server.

In the case that the electronic device 1000 receives performance information of the other external electronic device, the electronic device 1000 may transmit information of the registered external electronic device 600 to the other external electronic device based on the performance information of the other external electronic device. For example, the electronic device 1000 may identify that the number of proxy clients registered in the other external electronic device is equal to or greater than a specified number based on performance information of the other external electronic device and not transmit information of the registered external electronic device 600 to another external electronic device.

The information of the external electronic device 600 may include registration information (e.g., registration ID information (e.g., registration ID B)) allocated to the external electronic device 600 and performance information of the external electronic device 600.

The performance information of the external electronic device 600 may include performance information of the proxy client. For example, the performance information of the external electronic device 600 may include information indicating an operation mode (e.g., first communication mode and second communication mode) of the external electronic device 600 and/or the number of antennas used by the external electronic device 600.

The performance information of the external electronic device 600 may include information related to the second communication mode of the external electronic device 600.

The performance information of the external electronic device 600 may include information (or channel information) of a frequency band (e.g., 2.4 GHz) supportable in the second communication mode.

The performance information of the external electronic device 600 may include awake interval information of the second communication mode. A size of the awake interval of the second communication mode may be greater than that of the awake interval of the first communication mode.

The performance information of the external electronic device 600 may include information related to a function (or service) in which the electronic device 1000 may perform instead of the external electronic device 600 while the external electronic device 600 operates in the second communication mode. Information related to a function in which the electronic device 1000 may perform instead of the external electronic device 600 may include a function type (e.g., identification information of a passive scan and/or post initiation communication) and/or configuration information (e.g., further availability window (FAW) information indicating a time in which the communication circuit (e.g., the communication circuit 610 of FIG. 6) of the external electronic device 600 is activated at a time other than the DW) for performing post initiation communication.

In operation 1160, the electronic device 1000 may transmit information of the registered external electronic device 600 to another external electronic device or may operate as a proxy server without transmitting information of the registered external electronic device to another external electronic device corresponding to absence of another external electronic device operating as a proxy server (operation 1140-N).

The electronic device 1000 may transmit information of the external electronic device 600 operating as a proxy client to another external electronic device operating as a proxy server and operate as a proxy server for the external electronic device 600. The external electronic device 600 may perform a function of a proxy server for the external electronic device 600 using information of the external electronic device 600 transmitted by the electronic device 1000. In the case that the external electronic device 600 performs a proxy operation using an external electronic device other than the electronic device 1000 (or in the case that the external electronic device 600 goes out of coverage of the electronic device 1000 and enters coverage of another external electronic device 600), the external electronic device 600 may enable to use the proxy function without performing a proxy client registration procedure in another external electronic device.

Figure 12A:
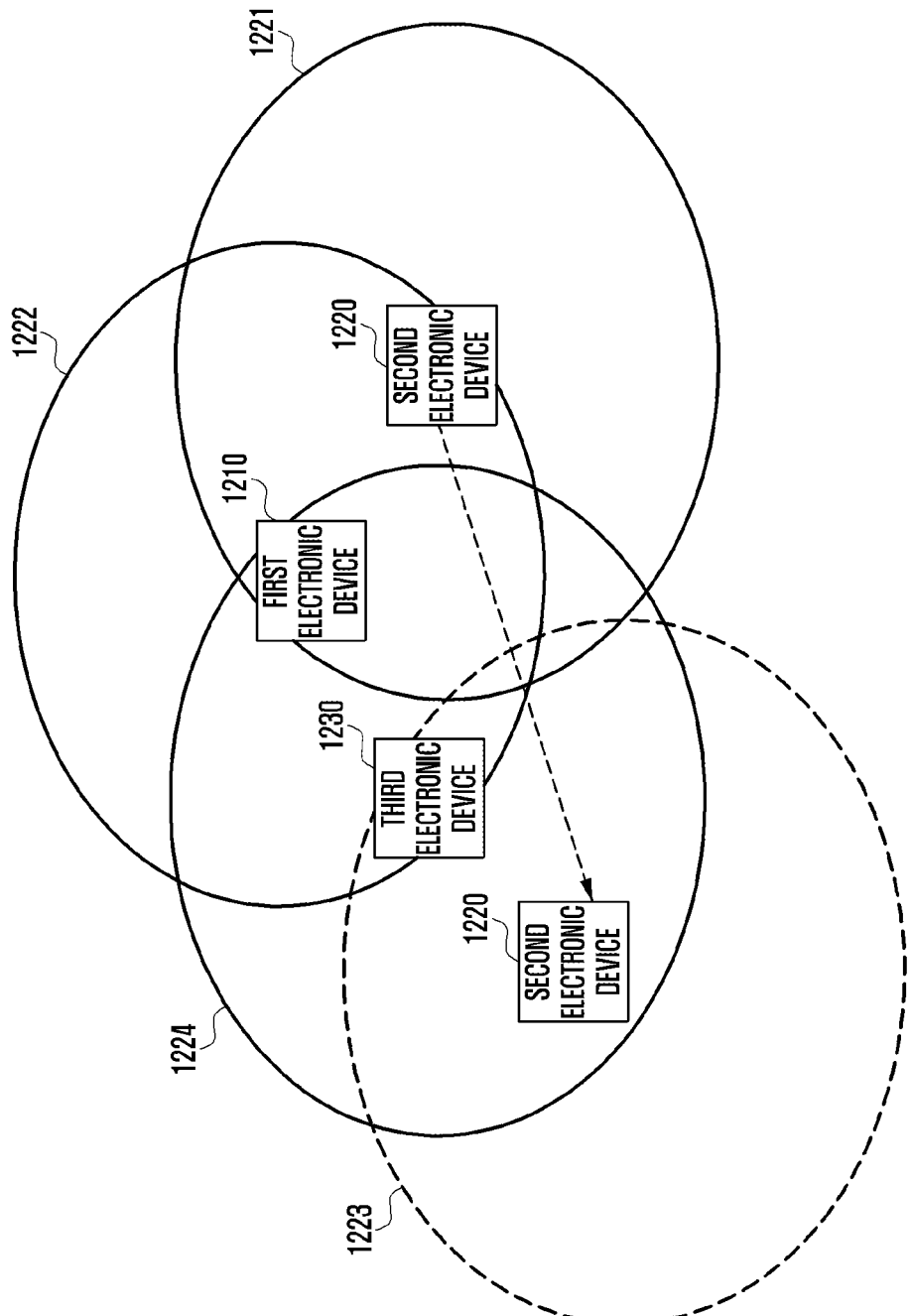
FIGS. 12A and 12B are diagrams illustrating an embodiment in which an electronic device transmits information of an external electronic device operating as a proxy client to another external electronic device according to various example embodiments.
Figure 12B:
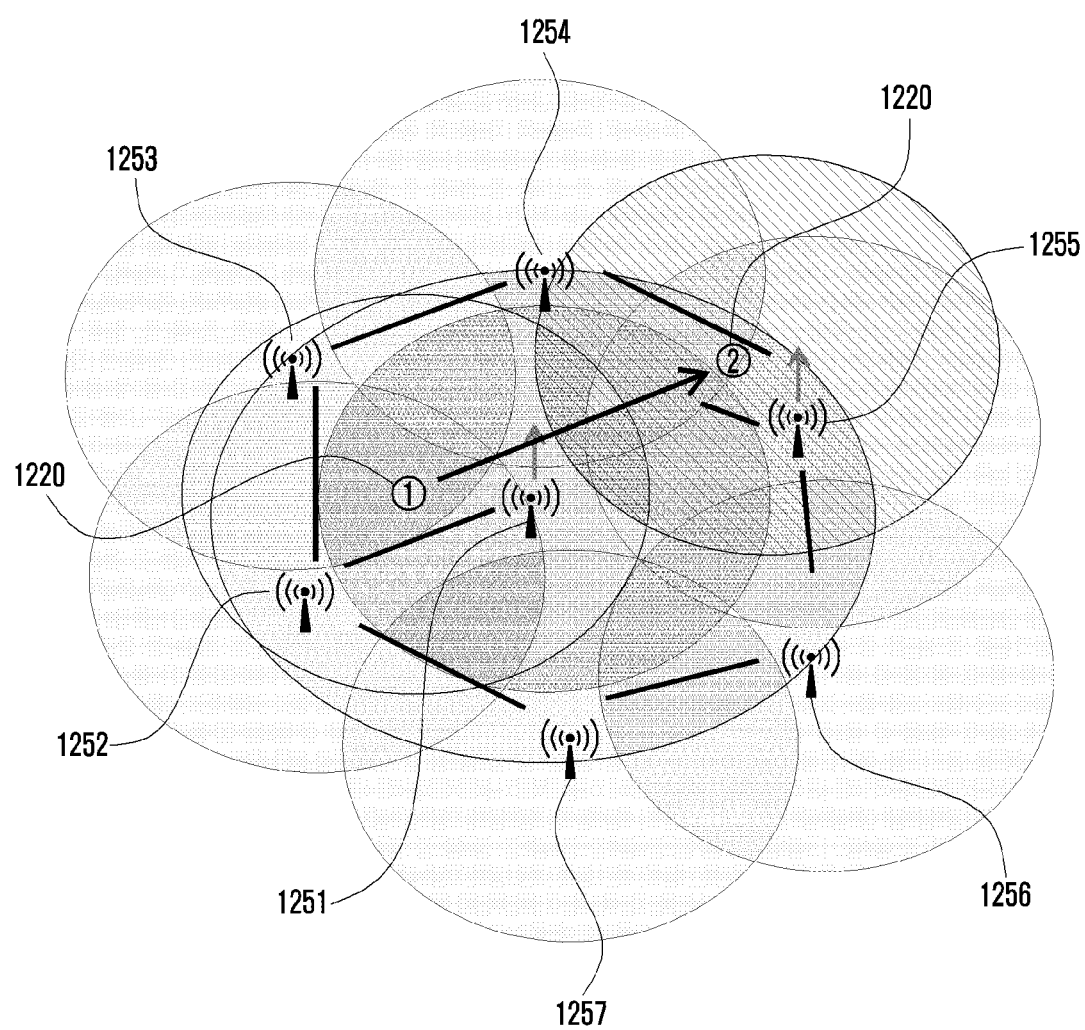

FIGS. 12A and 12B are diagrams illustrating an embodiment in which an electronic device transmits information of an external electronic device operating as a proxy client to another external electronic device according to various example embodiments.

With reference to FIG. 12A, a first electronic device 1210 (e.g., the electronic device 1000 of FIG. 10) may operate as a proxy server, and a second electronic device 1220 (e.g., the electronic device 600 of FIG. 6) may operate as a proxy client.

With reference to FIG. 12A, the first electronic device 1210 may be positioned inside coverage 1221 of the second electronic device 1220, and a third electronic device 1230 may be positioned outside the coverage 1221 of the second electronic device 1220. The third electronic device 1230 may be positioned inside coverage 1222 of the first electronic device 1210.

The first electronic device 1210 may broadcast a service discovery frame including information indicating whether the first electronic device 1210 may operate as a proxy server. The service discovery frame may include performance information of the first electronic device 1210 operating as a proxy server.

The information indicating whether the proxy server function is supported may include proxy server capability information and/or awake interval information (e.g., DW awake interval).

The second electronic device 1220 may perform synchronization with an NAN cluster based on NAN cluster information included in a signal broadcast by the first electronic device 1210 included in the cluster (or network) (e.g., the NAN cluster 200 of FIG. 2) implemented in a NAN method.

The second electronic device 1220 may receive NAN cluster information through a communication method (e.g., short range wireless communication including Wi-Fi or Bluetooth) other than an NAN-based method. For example, the second electronic device 1220 may transmit a probe request signal for finding the first electronic device 1210 to be connected through Wi-Fi and perform synchronization with the NAN cluster based on the NAN cluster information included in the probe response message transmitted by the first electronic device 1210 corresponding to the probe request signal.

NAN cluster synchronization may include an operation of receiving time clock information of an electronic device representing the NAN cluster so that the electronic devices included in the NAN cluster transmit and/or receive data on the same channel and/or during the same time. For example, the second electronic device 1220 may receive a beacon broadcast by the first electronic device 1210 and perform synchronize of the NAN cluster based on time clock information of the first electronic device 1210 included in the beacon.

After the NAN cluster synchronization is completed, the second electronic device 1220 may operate in the first communication mode. The first communication mode may be a mode that performs data transmission and/or reception for each DW having an interval of a first value. The second electronic device 1220 operating in the first communication mode may activate a communication circuit (e.g., the communication circuit 610 of FIG. 6) for each specified interval (e.g., a size of the DW having an interval of a first value) and receive data transmitted by electronic devices (e.g., the first electronic device 1210) included in the NAN cluster or transmit data to the first electronic device 1210 for each designated interval.

The second electronic device 1220 may determine whether to switch to the second communication mode while operating in the first communication mode. The second communication mode may be a communication mode that may have power consumption lower than that of the first communication mode or a communication mode in which the first electronic device 1210 instead of the second electronic device 1220 performs some of functions performed by the second electronic device 1220 in the first communication mode. As part of the operation of switching to the second communication mode, the second electronic device 1220 may register the first electronic device 1210 serving as a proxy server as a proxy client.

The second electronic device 1220 may transmit a proxy registration request signal including information related to a function in which the first electronic device 1210 may perform instead of the second electronic device 1220.

The proxy registration request signal may include information related to the second communication mode of the second electronic device 1220.

The proxy registration request signal may include awake interval information of the second communication mode of the second electronic device 1220. A size of the awake interval of the second communication mode may be greater than that of the awake interval of the first communication mode.

The proxy registration request signal may include information (or channel information) of a frequency band (e.g., 2.4 GHz) supportable in the second communication mode of the second electronic device 1220.

According to an embodiment, the proxy registration request signal may include information related to a function (or service) in which the first electronic device 1210 may perform instead of the second electronic device 1220 while the second electronic device 1220 operates in the second communication mode. Information related to a function in which the first electronic device 1210 may perform instead of the second electronic device 1220 may include a function type (e.g., identification information of a passive scan and/or post initiation communication) and/or configuration information (e.g., further availability window (FAW) information indicating a time in which the communication circuit 610 (e.g., see FIG. 6) is activated at a time other than the DW) for performing post initiation communication.

According to an embodiment, the proxy registration request signal may include performance information of the second electronic device 1220. The performance information of the second electronic device 1220 may include performance information of the proxy client. For example, the performance information of the second electronic device 1220 may include information indicating an operation mode (e.g., first communication mode or second communication mode) of the second electronic device 1220 and/or the number of antennas used by the second electronic device 1220.

The performance information of the second electronic device 1220 included in the proxy registration request signal transmitted in the first communication mode and the performance information of the second electronic device 1220 included in the proxy registration request signal transmitted in the second communication mode may be different. According to an embodiment, the number (e.g., 4) of antennas included in the performance information of the second electronic device 1220 included in the proxy registration request signal transmitted in the first communication mode and the number (e.g., two) of antennas included in the performance information of the second electronic device 1220 included in the proxy registration request signal transmitted in the second communication mode may be different.

According to an embodiment, the proxy registration request signal may include timeout information of at least some of information included therein. For example, the first electronic device 1210 that has received the proxy registration request signal may delete (or ignore) information included in the proxy registration request signal as timeout information expires, and end a proxy server operation for the second electronic device 1220. The first electronic device 1210 may transmit a proxy registration termination message to the second electronic device 1220.

The first electronic device 1210 may receive the proxy registration request signal and transmit a response message (e.g., proxy registration response message) on whether proxy registration of the second electronic device 1220 to the second electronic device 1220 in response to the proxy registration request. According to an embodiment, the response message may include information (e.g., status) on acceptance or rejection for the proxy registration request of the second electronic device 1220. According to an embodiment, in the case that the first electronic device 1210 accepts the proxy registration request of the second electronic device 1220, the response message may include registration information (e.g., registration ID information (e.g., registration ID B)) allocated to the second electronic device 1220.

As the registration of the proxy client is completed, the second electronic device 1220 may operate in the second communication mode.

In the second communication mode, the second electronic device 1220 may enable the first electronic device 1210 to perform some of functions performed by the second electronic device 1220 in the first communication mode.

The first electronic device 1210 may identify whether another external electronic device (e.g., the third electronic device 1230) operating as a proxy server exists.

The first electronic device 1210 may receive a service discovery frame transmitted by the third electronic device 1230 through a service discovery procedure. The first electronic device 1210 may identify information indicating whether the first electronic device 1210 may operate as a proxy server included in the service discovery frame, and identify whether the third electronic device 1230 may operate as a proxy server.

The first electronic device 1210 may transmit information of the second electronic device 1220 operating as a proxy client registered in the first electronic device 1210 to the third electronic device 1230 operable as a proxy server.

The information of the second electronic device 1220 may include registration information (e.g., registration ID information (e.g., registration ID)) allocated to the first electronic device 1210, and performance information of the external electronic device 600.

The first electronic device 1210 may transmit information of the second electronic device 1220 operating as a proxy client to the third electronic device 1230 operating as a proxy server; thus, even if the second electronic device 1220 does not perform a proxy client registration procedure in the third electronic device 1230, the third electronic device 1230 may acquire information of the second electronic device 1220 and operate as a proxy server for the second electronic device 1220.

With reference to FIG. 12A, the second electronic device 1220 may move the first electronic device 1210 in a searchable state. After the second electronic device 1220 is moved, the first electronic device 1210 may not exist within coverage 1223 of the second electronic device 1220. However, the third electronic device 1230 operable as a proxy server for the second electronic device 1220 may exist within the coverage 1223 of the second electronic device 1220. Alternatively, the second electronic device 1220 may exist within coverage 1224 of the third electronic device 1230. Accordingly, even after the second electronic device 1220 is moved, the second electronic device 1220 may operate in the second communication mode without performing a separate proxy client registration procedure.

The above-described embodiment may be applied even to a plurality of access points (APs) generating a NAN cluster, and a specific example thereof will be described later with reference to FIG. 12B.

FIG. 12B is a diagram illustrating an embodiment in which an electronic device transmits information of an external electronic device operating as a proxy client to another external electronic device according to various example embodiments.

With reference to FIG. 12B, a plurality of access points (APs) including a first AP 1251, a second AP 1252, a third AP 1253, a fourth AP 1254, a fifth AP 1255, a sixth AP 1256, and/or a seventh AP 1257 may constitute different NAN clusters.

All of the first AP 1251, the second AP 1252, the third AP 1253, the fourth AP 1254, the fifth AP 1255, the sixth AP 1256, and/or the seventh AP 1257 may operate as NAN proxy servers and perform proxy functions requested by proxy clients existing within coverage of each AP.

The electronic device (e.g., the second electronic device 1220 of FIG. 12A) may exist in a NAN cluster that the first AP 1251 may provide. The electronic device 1220 may transmit a proxy registration request signal to the first AP 1251 and operate as a proxy client.

The first AP 1251 may transmit information of the electronic device 1220 included in the proxy registration request signal to other APs (e.g., the second AP 1252, the third AP 1253, the fourth AP 1254, the fifth AP 1255, the sixth AP 1256, and/or the seventh AP 1257). The first AP 1251 transmits information of the electronic device 1220 operating as a proxy client to another AP (e.g., the second AP 1252, the third AP 1253, the fourth AP 1254, the fifth AP 1255, the sixth AP 1256, and/or the seventh AP 1257) operating as a proxy server; thus, even if the electronic device 1220 does not perform a proxy client registration procedure in another AP (e.g., the second AP 1252, the third AP 1253, the fourth AP 1254, the fifth AP 1255, the sixth AP 1256, and/or the seventh AP 1257), another AP (e.g., the second AP 1252, the third AP 1253, the fourth AP 1254, the fifth AP 1255, the sixth AP 1256, and/or the seventh AP 1257) may acquire information of the electronic device 1220 and operate as a proxy server for the electronic device 1220.

With reference to FIG. 12B, the electronic device 1220 may move in a state that exists in a location (e.g., ① of FIG. 12E) that may search for the first AP 1251. After the electronic device 1220 moves, the electronic device 1220 may exist at a location (e.g., ② of FIG. 12B) outside coverage of the first AP 1251. In the case that the electronic device 1220 exists at a location outside coverage of the first AP 1251, the connection between the electronic device 1220 and the first AP 1251 may be released, and a situation in which the electronic device 1220 may not operate as a proxy client for the first AP 1251 may occur.

However, the electronic device 1220 may exist within coverage of the fifth AP 1255 that may operate as a proxy server thereof. The fifth AP 1255 may receive information of the electronic device 1220 from the first AP 1251 and operate as a proxy server using the information of the electronic device 1220. Accordingly, even after the electronic device 1220 moves, the electronic device 1220 may operate in the second communication mode without transmitting information of the electronic device 1220 to the fifth AP 1255 through a separate proxy client registration procedure.

According to an embodiment, the electronic device (e.g., the second electronic device 1220 of FIG. 12A) may receive a service discovery frame including information indicating whether the electronic device may operate as a proxy server from a plurality of external electronic devices (e.g., the first AP 1251, the second AP 1252, the third AP 1253, the fourth AP 1254, the fifth AP 1255, the sixth AP 1256, and/or the seventh AP 1257). For example, the electronic device may receive a service discovery frame including information indicating whether the electronic device may operate as a proxy server from two or more of the first AP 1251, the second AP 1252, the third AP 1253, the fourth AP 1254, the fifth AP 1255, the sixth AP 1256, and/or the seventh AP 1257. According to an embodiment, in the case that the electronic device 1220 receives a service discovery frame including information indicating whether the electronic device 1220 may operate as a proxy server from two or more external electronic devices, the electronic device 1220 may transmit a proxy registration request signal to the plurality of external electronic devices that have transmitted the service discovery frame and perform a proxy client registration procedure with each external electronic device. The electronic device 1220 may determine one external electronic device as a proxy server based on a result of performing a proxy client registration procedure with a plurality of external electronic devices.

An electronic device (e.g., the electronic device 600 of FIG. 6) according to various example embodiments may include a communication circuit (e.g., the communication circuit 610 of FIG. 6) and a processor (e.g., the processor 620 of FIG. 6) operatively connected, directly or indirectly, to the communication circuit 610, wherein the processor may be configured to perform synchronization with the NAN 200 based on NAN cluster information included in a signal broadcast by an external electronic device (e.g., the electronic device 210, 220, 230, and 240 of FIG. 2, the electronic device 1000 of FIG. 10) included in NAN (e.g., the NAN cluster 200 of FIG. 2), to determine whether to switch to a second communication mode operable with lower power than that of a first communication mode based on a state of the electronic device 600 while operating in the first communication mode capable of transmitting and/or receiving data each interval having a first value, to search for the electronic device 1000 capable of performing a function of a proxy server among the external electronic devices 210, 220, 230, 240 and 1000 included in the NAN corresponding to determining to switch to the second communication mode, to transmit a proxy registration request signal to the found external electronic device 1000, and to operate in the second communication mode corresponding to completion of registration to the external electronic device 1000, wherein the proxy registration request signal may include information related to a function to be performed by the external electronic device 1000 instead of the electronic device 600 while operating in the second communication mode.

In the electronic device 600 according to various example embodiments, the second communication mode may be a communication mode capable of transmitting and/or receiving data each interval having a second value greater than the first value.

In the electronic device 600 according to various example embodiments, while the processor 620 operates in the second communication mode, the electronic device 600 may not support a communication method of performing data transmission and/or reception through another communication method performed using the communication circuit 610 between intervals having the second value.

In the electronic device 600 according to various example embodiments, while the processor 620 operates in the second communication mode, the external electronic device 1000 may be configured to instead perform a configuration procedure for performing data transmission and/or reception through another communication method through the communication circuit 610 between intervals having the second value.

In the electronic device 600 according to various example embodiments, the external electronic device 1000 may be configured to instead perform a scan operation for searching for other external electronic devices 210, 220, 230, and 240 related to the NAN while the processor 620 operates in the second communication mode.

In the electronic device 600 according to various example embodiments, the processor 620 may be configured to perform an operation of merging the NAN with another network based on a scan result performed by the external electronic device 1000.

In the electronic device 600 according to various example embodiments, the processor 620 may be configured to transmit a signal for identifying a connection state between the external electronic device 1000 and the electronic device 600 to the external electronic device 1000 every designated cycle while operating in the second communication mode and to determine whether to maintain the second communication mode based on whether a response signal corresponding to the signal is received.

In the electronic device 600 according to various example embodiments, the processor 620 may be configured to transmit performance information of the electronic device 600 to the external electronic device 1000 while operating in the second communication mode, wherein performance information of the electronic device 600 transmitted while operating in the second communication mode may be different from performance information of the electronic device 600 operating in the first communication mode.

In the electronic device 600 according to various example embodiments, the number of frequency bands supported by the communication circuit 610 while operating in the second communication mode may be configured to be smaller than that of frequency bands supported by the communication circuit 610 while operating in the first communication mode.

In the electronic device 600 according to various example embodiments, the number of antennas in which the electronic device 600 may use while operating in the second communication mode may be configured to be smaller than that of antennas supported by the communication circuit 610 while operating in the first communication mode.

A method of operating an electronic device (e.g., the electronic device 600 of FIG. 6) according to various example embodiments may include performing synchronization with the NAN 200 based on NAN cluster information included in a signal broadcast by an external electronic device (e.g., the electronic device 210, 220, 230, or 240 of FIG. 2 or the electronic device 1000 of FIG. 10) included in NAN (e.g., the NAN cluster 200 of FIG. 2), determining whether to switch to a second communication mode operable with lower power than that of the first communication mode based on a state of the electronic device 600 while operating in the first communication mode capable of transmitting and/or receiving data each interval having a first value, searching for an external electronic device 1000 capable of performing a function of a proxy server among the external electronic devices 210, 220, 230, 240, and 1000 included in the NAN 200 corresponding to determining to switch to the second communication mode, transmitting a proxy registration request signal to the found external electronic device 1000, and operating in the second communication mode corresponding to completion of registration to the external electronic device 1000, wherein the method includes, wherein the proxy registration request signal may include information related to a function to be performed by the external electronic device 1000 instead of the electronic device 600 while operating in the second communication mode.

In the method of operating the electronic device 600 according to various example embodiments, the second communication mode may be a mode that does not support a communication method of performing data transmission and/or reception through another communication method using the communication circuit (e.g., the communication circuit 610 of FIG. 6) between intervals having the second value.

In the method of operating the electronic device 600 according to various example embodiments, the second communication mode may be a mode in which the external electronic device performs instead a configuration procedure for performing data transmission and/or transmission through another communication method through the communication circuit 610 between intervals having the second value.

The method of operating the electronic device 600 according to various example embodiments may further include receiving a result of performing instead of the electronic device 600 a scan operation for searching for other external electronic devices 210, 220, 230, and 240 related to the NAN 200 from the external electronic device 1000 while operating in the second communication mode and merging the NAN 200 with another network based on a scan result performed by the external electronic device 1000.

The method of operating the electronic device 600 according to various example embodiments may further include transmitting a signal for identifying a connection state between the external electronic device 1000 and the electronic device 600 to the external electronic device 1000 each designated cycle while operating in the second communication mode and determining whether to maintain the second communication mode based on whether a response signal corresponding to the signal is received.

The method of operating the electronic device 600 according to various example embodiments may further include transmitting performance information of the electronic device 600 to the external electronic device 1000 while operating in the second communication mode, and performance information of the electronic device 600 transmitted while operating in the second communication mode may be different from that of the electronic device 600 operating in the first communication mode.

In a method of operating the electronic device 600 according to various example embodiments, the number of frequency bands supported by the electronic device 600 while operating in the second communication mode may be configured to be smaller than that of frequency bands supported by the electronic device 600 while operating in the first communication mode.

An electronic device (e.g., the electronic device 1000 of FIG. 10 or the first electronic device 1210 of FIG. 12A) according to various example embodiments may include a communication circuit (e.g., the communication circuit 1010 of FIG. 10) and a processor (e.g., the processor 1020 of FIG. 10) operatively connected, directly or indirectly, to the communication circuit 1010, wherein the processor 1020 may be configured to perform synchronization with the NAN 200 based on the NAN cluster information included in a signal broadcast by an external electronic device (e.g., the electronic device 210, 220, 230, or 240 of FIG. 2, the electronic device 600 of FIG. 6, or the second electronic device 1220 of FIG. 12A) included in NAN (e.g., the NAN cluster 200 of FIG. 2), to register the external electronic devices 600 and 1220 as the proxy client based on a signal transmitted by an external electronic device 600 that intends to operate as a proxy client among external electronic devices 210, 220, 230, 240, and 600 included in the NAN 200 while operating as a proxy server in the NAN cluster 200, and to transmit information of the external electronic devices 600 and 1220 to the other external electronic device 1230 by searching for another external electronic device (e.g., the third electronic device 1230 of FIG. 12A) operating as a proxy server. "Based on" as used herein covers based at least on.

In the electronic device 1000 according to various example embodiments, the processor 1020 may be configured to receive information of an external electronic device operating as a proxy client registered in the other external electronic device 1230 from the other external electronic device 1230 and to perform a function of a proxy server based on information of an external electronic device operating as a proxy client registered in the other external electronic device 1230.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device, comprising:
a communication circuit; and
a processor operatively connected to the communication circuit,
wherein the processor is configured to:
perform synchronization with neighbor awareness networking (NAN) based on NAN cluster information included in a signal broadcast by an external electronic device included in the NAN,
determine whether to switch to a second communication mode operable with lower power than that of a first communication mode based on a state of the electronic device while operating in the first communication mode capable of transmitting and/or receiving data each interval having a first value,
search for an external electronic device capable of performing a function of a proxy server among external electronic devices included in the NAN based on determination of switching to the second communication mode,
transmit a proxy registration request signal to the external electronic device, and
operate in the second communication mode based on a completion of registration to the external electronic device, and
wherein the proxy registration request signal comprises information related to a function to be performed by the external electronic device, instead of the electronic device, while operating in the second communication mode.

2. The electronic device of claim 1, wherein the second communication mode comprises a communication mode capable of transmitting and/or receiving data each interval having a second value greater than the first value.

3. The electronic device of claim 2, wherein the processor is configured to not support a communication comprising performing data transmission and/or reception through another communication technique performed using the communication circuit between intervals having the second value while operating in the second communication mode.

4. The electronic device of claim 2, wherein the processor is configured so that the external electronic device performs instead a configuration procedure for performing data transmission and/or reception through another communication technique through the communication circuit between intervals having the second value while operating in the second communication mode.

5. The electronic device of claim 1, wherein the processor is configured so that the external electronic device performs instead a scan operation for searching for another external electronic device related to the NAN while operating in the second communication mode.

6. The electronic device of claim 5, wherein the processor is configured to perform an operation of merging the NAN with another network based on a scan result performed by the external electronic device.

7. The electronic device of claim 1, wherein the processor is configured to:
control the communication circuit to transmit a signal for identifying a connection state between the external electronic device and the electronic device to the external electronic device every designated cycle while operating in the second communication mode, and
determine whether to maintain the second communication mode based on whether a response signal corresponding to the signal is received.

8. The electronic device of claim 1, wherein the processor is configured to control to transmit performance information of the electronic device to the external electronic device while operating in the second communication mode, and performance information of the electronic device to be transmitted while operating in the second communication mode is configured to be different from that of the electronic device operating in the first communication mode.

9. The electronic device of claim 1, wherein the number of frequency bands supported by the communication circuit while operating in the second communication mode is configured to be smaller than that of frequency bands supported by the communication circuit while operating in the first communication mode.

10. The electronic device of claim 1, wherein the number of antennas in which the electronic device may use while operating in the second communication mode is smaller than that of antennas supported by the communication circuit while operating in the first communication mode.

11. A method of operating an electronic device, the method comprising:

performing synchronization with neighbor awareness networking (NAN) based on NAN cluster information included in a signal broadcast by an external electronic device included in the NAN;

determining whether to switch to a second communication mode operable with lower power than that of a first communication mode based on a state of the electronic device while operating in the first communication mode capable of transmitting and/or receiving data each interval having a first value;

searching for an external electronic device capable of performing a function of a proxy server among external electronic devices included in the NAN based on determining to switch to the second communication mode;

transmitting a proxy registration request signal to the searched external electronic device; and operating in the second communication mode based on completion of registration to the external electronic device, wherein the proxy registration request signal comprises information related to a function to be performed by the external electronic device, instead of the electronic device, while operating in the second communication mode.

12. The method of claim 11, wherein the second communication mode is a communication mode capable of transmitting and/or receiving data each interval having a second value greater than the first value.

13. The method of claim 12, wherein the second communication mode is a mode that does not support a communication method of performing data transmission and/or reception through another communication method using the communication circuit between intervals having the second value.

14. The method of claim 12, wherein the second communication mode is a mode in which the external electronic device performs instead a configuration procedure for performing data transmission and/or reception through another communication method through the communication circuit between intervals having the second value.

15. The method of claim 11, further comprising:

receiving, from the external electronic device, a result of performing a scan operation for searching for another external electronic device related to the NAN instead of the electronic device while operating in the second communication mode; and merging the NAN with another network based on a scan result performed by the external electronic device.

16. The method of claim 11, further comprising:

transmitting a signal for identifying a connection state between the external electronic device and the electronic device to the external electronic device every designated cycle while operating in the second communication mode; and determining whether to maintain the second communication mode based on whether a response signal corresponding to the signal is received.

17. The method of claim 11, further comprising transmitting performance information of the electronic device to the external electronic device while operating in the second communication mode, wherein performance information of the electronic device transmitted while operating in the second communication mode is different from that of the electronic device operating in the first communication mode.

18. The method of claim 11, wherein the number of frequency bands supported by the electronic device while operating in the second communication mode is smaller than that of frequency bands supported by the electronic device while operating in the first communication mode.

19. An electronic device, comprising:

a communication circuit; and a processor operatively connected to the communication circuit;

wherein the processor is configured to:

perform synchronization with neighbor awareness networking (NAN) based on NAN cluster information included in a signal broadcast by an external electronic device included in the NAN, register an external electronic device as a proxy client based on a signal from the external electronic device, that is to operate as the proxy client among external electronic devices included in the NAN while operating as a proxy server in the NAN cluster, and control to transmit information regarding the external electronic device to the other external electronic device based on searching for another external electronic device operating as a proxy server.

20. The electronic device of claim 19, wherein the processor is configured to:

receive information of an external electronic device operating as a proxy client registered in the other external electronic device from the other external electronic device, and perform a function of a proxy server based on information of an external electronic device operating as a proxy client registered in the other external electronic device.

* * * * *